US009486917B2

United States Patent
Reid et al.

(10) Patent No.: US 9,486,917 B2
(45) Date of Patent: Nov. 8, 2016

(54) MOBILE AUTOMATED ASSEMBLY TOOL FOR AIRCRAFT STRUCTURES

(71) Applicant: The Boeing Company, Chicago, IL (US)

(72) Inventors: Eric M. Reid, Bothell, WA (US); Darrell Darwin Jones, Mill Creek, WA (US); Clayton Lynn Munk, Maple Valley, WA (US); Steven A. Best, Marysville, WA (US); Matthew Ray DesJardien, Kenmore, WA (US); Carlos Daniel Crespo, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 13 days.

(21) Appl. No.: 14/558,859

(22) Filed: Dec. 3, 2014

(65) Prior Publication Data

US 2015/0314436 A1 Nov. 5, 2015

Related U.S. Application Data

(60) Provisional application No. 61/986,756, filed on Apr. 30, 2014.

(51) Int. Cl.
*B25J 5/00* (2006.01)
*B23P 19/06* (2006.01)
(Continued)

(52) U.S. Cl.
CPC ............... *B25J 5/007* (2013.01); *B23B 41/00* (2013.01); *B23P 19/06* (2013.01); *B25J 11/005* (2013.01);
(Continued)

(58) Field of Classification Search
CPC ........ B25J 5/007; B25J 1/007; B25J 11/005; B64F 5/0009; B23B 41/00; B23B 2215/04; B23P 19/06; Y10T 29/4989; Y10T 408/05; Y10T 29/5107; Y10T 408/03; Y10T 408/55; Y10T 29/49828; B23Q 3/103; B25B 11/02; B23K 37/0443

USPC ................. 414/800, 589, 590; 269/289 MR; 29/281.1, 281.5

See application file for complete search history.

(56) References Cited

U.S. PATENT DOCUMENTS

| 4,006,650 A | * | 2/1977 | Elmer | ................... B23B 31/204 74/813 C |
| 4,108,566 A | | 8/1978 | Jones | |

(Continued)

FOREIGN PATENT DOCUMENTS

| CA | 2497249 A1 | 8/2006 |
| EP | 1227316 A2 | 7/2002 |

(Continued)

OTHER PUBLICATIONS

Extended European Search Report, dated Jan. 27, 2016, regarding Application No. EP14196480.9, 10 pages.

(Continued)

*Primary Examiner* — Jeanette E Chapman
(74) *Attorney, Agent, or Firm* — Yee & Associates, P.C.

(57) ABSTRACT

A method and apparatus for performing an operation on a surface of a structure. An assembly system may comprise a motion platform and a mobile platform. The motion platform may be configured to be positioned below the surface of the structure to perform the operation on the surface. The mobile platform may be configured to carry the motion platform across a floor of a manufacturing environment from a first location to a second location.

41 Claims, 16 Drawing Sheets

(51) Int. Cl.
*B25J 11/00* (2006.01)
*B23B 41/00* (2006.01)
*B64F 5/00* (2006.01)

(52) U.S. Cl.
CPC ............ B25J 11/007 (2013.01); B64F 5/0009 (2013.01); *B23B 2215/04* (2013.01); *Y10T 29/4989* (2015.01); *Y10T 29/49828* (2015.01); *Y10T 29/5107* (2015.01); *Y10T 408/03* (2015.01); *Y10T 408/05* (2015.01); *Y10T 408/55* (2015.01)

(56) References Cited

U.S. PATENT DOCUMENTS

| | | | | |
|---|---|---|---|---|
| 4,148,401 | A | * | 4/1979 | Kautetzky ............. B23P 19/067 414/590 |
| 4,477,216 | A | * | 10/1984 | Van De Motter ...... B23D 37/12 409/257 |
| 4,483,080 | A | | 11/1984 | Knoll |
| 4,599,018 | A | | 7/1986 | Woods |
| 4,674,949 | A | | 6/1987 | Kroczynski |
| 4,710,086 | A | * | 12/1987 | Naaktgeboren ........ A01D 90/08 414/111 |
| 4,781,517 | A | | 11/1988 | Pearce et al. |
| 4,850,763 | A | | 7/1989 | Jack et al. |
| 4,940,382 | A | | 7/1990 | Castelain et al. |
| 5,022,542 | A | | 6/1991 | Beier |
| 5,150,506 | A | | 9/1992 | Kotake et al. |
| 5,326,201 | A | * | 7/1994 | King ..................... B23D 37/04 409/251 |
| 5,351,626 | A | | 10/1994 | Yanagisawa |
| 5,390,128 | A | | 2/1995 | Ryan et al. |
| 5,407,415 | A | * | 4/1995 | Spishak ............. G05B 19/4182 219/121.82 |
| 5,468,099 | A | | 11/1995 | Wheetley et al. |
| 5,526,203 | A | * | 6/1996 | Mohajerani .......... G11B 33/148 360/99.15 |
| 5,653,351 | A | | 8/1997 | Grout et al. |
| 5,709,026 | A | * | 1/1998 | Veselaski ............. B29C 31/008 29/566.2 |
| 5,715,729 | A | | 2/1998 | Toyama et al. |
| 5,920,394 | A | | 7/1999 | Gelbart et al. |
| 6,098,260 | A | | 8/2000 | Sarh |
| 6,779,272 | B2 | | 8/2004 | Day et al. |
| 6,843,328 | B2 | | 1/2005 | Boyl-Davis et al. |
| 6,862,912 | B2 | * | 3/2005 | Olsson ..................... B21J 7/34 72/355.6 |
| 6,871,524 | B2 | * | 3/2005 | Olsson ..................... B21J 5/12 72/355.6 |
| 6,926,094 | B2 | | 8/2005 | Arntson et al. |
| 7,273,333 | B2 | | 9/2007 | Buttrick et al. |
| 7,406,758 | B2 | | 8/2008 | Jones et al. |
| 7,614,154 | B2 | | 11/2009 | Cobb |
| 8,005,563 | B2 | | 8/2011 | Cobb et al. |
| 8,299,118 | B2 | * | 10/2012 | Chang .................. A61K 9/0048 514/530 |
| 8,539,658 | B2 | | 9/2013 | Munk |
| 8,606,388 | B2 | | 12/2013 | Cobb et al. |
| 8,620,470 | B2 | | 12/2013 | Cobb et al. |
| 8,661,684 | B1 | | 3/2014 | Boyd et al. |
| 8,790,050 | B2 | | 7/2014 | Marguet et al. |
| 9,090,357 | B2 | | 7/2015 | Oberoi et al. |
| 9,205,933 | B2 | | 12/2015 | Oberoi et al. |
| 9,299,118 | B1 | * | 3/2016 | McGraw ................ G01B 11/02 |
| 2002/0066192 | A1 | | 6/2002 | Cunningham et al. |
| 2003/0043964 | A1 | | 3/2003 | Sorenson |
| 2005/0036879 | A1 | | 2/2005 | Jhaveri et al. |
| 2005/0049126 | A1 | * | 3/2005 | Everson ............. B23Q 3/15513 483/47 |
| 2005/0172470 | A1 | | 8/2005 | Cobb et al. |
| 2005/0223549 | A1 | * | 10/2005 | Braun ................. B23K 26/0093 29/799 |
| 2006/0108470 | A1 | | 5/2006 | McCrary et al. |
| 2007/0029877 | A1 | | 2/2007 | Longley |
| 2007/0180674 | A1 | * | 8/2007 | Morden ................... B21J 15/14 29/407.01 |
| 2008/0077276 | A1 | | 3/2008 | Sanjuan et al. |
| 2008/0155807 | A1 | * | 7/2008 | Toh ......................... B21J 15/14 29/525.01 |
| 2008/0205763 | A1 | | 8/2008 | Marsh et al. |
| 2009/0112349 | A1 | | 4/2009 | Cobb et al. |
| 2010/0025349 | A1 | | 2/2010 | Khoshnevis |
| 2010/0180711 | A1 | | 7/2010 | Kilibarda et al. |
| 2010/0204817 | A1 | | 8/2010 | Fujita |
| 2010/0217437 | A1 | * | 8/2010 | Sarh ....................... B64F 5/0009 700/248 |
| 2011/0010007 | A1 | | 1/2011 | Sarh et al. |
| 2011/0054694 | A1 | | 3/2011 | Munk |
| 2011/0132548 | A1 | | 6/2011 | De Mattia |
| 2011/0178727 | A1 | | 7/2011 | Hafenrichter et al. |
| 2011/0214586 | A1 | | 9/2011 | Wessel et al. |
| 2012/0014759 | A1 | | 1/2012 | Sarh et al. |
| 2012/0210802 | A1 | | 8/2012 | Sarh et al. |
| 2013/0014368 | A1 | * | 1/2013 | Woods ................... B21J 15/285 29/407.01 |
| 2013/0018525 | A1 | | 1/2013 | Jang et al. |
| 2013/0145850 | A1 | | 6/2013 | Lute, Jr. et al. |
| 2013/0152397 | A1 | | 6/2013 | Oberoi et al. |
| 2013/0158697 | A1 | | 6/2013 | Stone et al. |
| 2013/0226340 | A1 | | 8/2013 | Buchstab |
| 2014/0157588 | A1 | | 6/2014 | Boyd et al. |
| 2014/0277717 | A1 | | 9/2014 | Jung et al. |
| 2014/0305217 | A1 | | 10/2014 | Tapia et al. |
| 2014/0340509 | A1 | * | 11/2014 | Fairbairn ................. H04N 7/18 348/95 |
| 2015/0135535 | A1 | | 5/2015 | Hallam et al. |
| 2015/0266147 | A1 | | 9/2015 | Reid et al. |

FOREIGN PATENT DOCUMENTS

| | | | | |
|---|---|---|---|---|
| EP | 1884453 | A2 | 2/2008 | |
| EP | 2108515 | A1 | 10/2009 | |
| EP | 2221151 | A2 | 8/2010 | |
| EP | 2631041 | A2 * | 8/2013 | ............... B25J 5/04 |
| GB | 2329138 | A | 3/1993 | |
| GB | 2473100 | A | 3/2011 | |
| GB | 2498977 | A | 8/2013 | |
| WO | WO2010018340 | A2 | 2/2010 | |
| WO | WO2014193602 | A2 | 12/2014 | |

OTHER PUBLICATIONS

Spishak et al., "Magnet Sensing Hole Driller and Method Therefor," U.S. Appl. No. 13/931,165, filed Jun. 28, 2013, 33 pages.
Larson et al., "Modular Stanchion System," U.S. Appl. No. 13/926,646, filed Jun. 25, 2013, 31 pages.
Desjardien et al., "Modular and Reconfigurable Support System," U.S. Appl. No. 13/904,789, filed May 29, 2013, 73 pages.
Best et al., "Apparatus and Method for Moving a Structure in a Manufacturing Environment," U.S. Appl. No. 13/940,843, filed Jul. 12, 2013, 45 pages.
Valenzuela et al., "Systems and Methods for Movement of Objects," U.S. Appl. No. 14/189,828, filed Feb. 25, 2014, 41 pages.
Larson et al., "Modular Stanchion System," U.S. Appl. No. 14/265,946, filed Apr. 30, 2014, 34 pages.
Cobb et al., "Metrology System for Positioning Assemblies," U.S. Appl. No. 14/559,034, filed Dec. 3, 2014, 84 pages.
Day et al., "Crawler Robot and Supporting Platform," U.S. Appl. No. 14/558,850, filed Dec. 3, 2014, 78 pages.
Desjardien et al., "Apparatus, System, and Method for Supporting a Wing Assembly," U.S. Appl. No. 14/558,834, filed Dec. 3, 2014, 88 pages.
Reid et al., "System and Method for Positioning an Automated Assembly Tool Relative to a Structure," U.S. Appl. No. 14/558,853, filed Dec. 3, 2014, 128 pages.
Day et al., "Flexible Manufacturing System for Aircraft Structures," U.S. Appl. No. 14/558,867, filed Dec. 3, 2014, 153 pages.
Desjardien et al., "Mobile Automated Overhead Assembly Tool for Aircraft Structures," U.S. Appl. No. 14/558,899, filed Dec. 3, 2014, 100 pages.

(56) References Cited

OTHER PUBLICATIONS

Extended European Search Report, dated Sep. 22, 2015, regarding Application No. EP14196571.5, 8 pages.
Partial European Search Report, dated Sep. 30, 2015, regarding Application No. EP14196480.9, 6 pages.
Extended European Search Report, dated Oct. 2, 2015, regarding Application No. EP14196553.3, 7 pages.
Extended European Search Report, dated Apr. 8, 2016, regarding Application No. EP14196494.0, 6 pages.
Extended European Search Report, dated May 2, 2016, regarding Application No. EP14196483.3, 7 pages.
Extended European Search Report, dated May 2, 2016, regarding Application No. EP14196468.4, 7 pages.
Extended European Search Report, dated May 3, 2016, regarding Application No. EP14196548.3, 7 pages.
Office Action, dated May 12, 2016, regarding U.S. Appl. No. 14/558,899, 35 pages.
Office Action, dated Mar. 4, 2016, regarding U.S. Appl. No. 14/558,850, 24 pages.

* cited by examiner

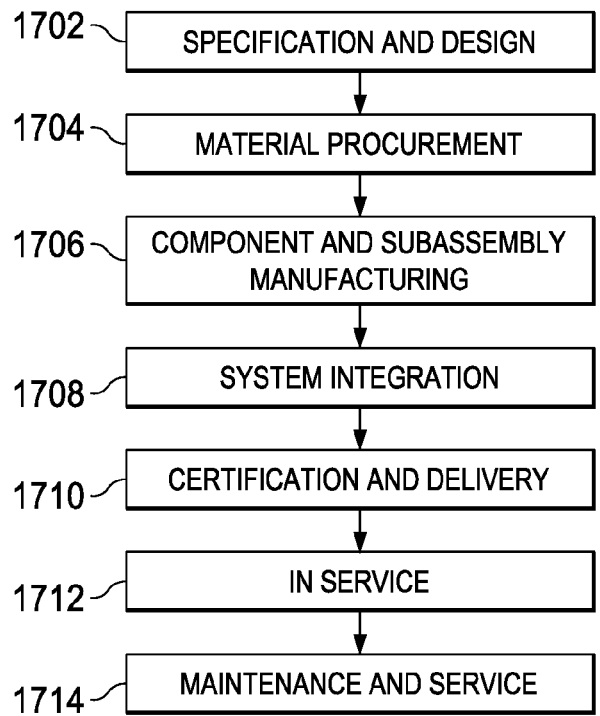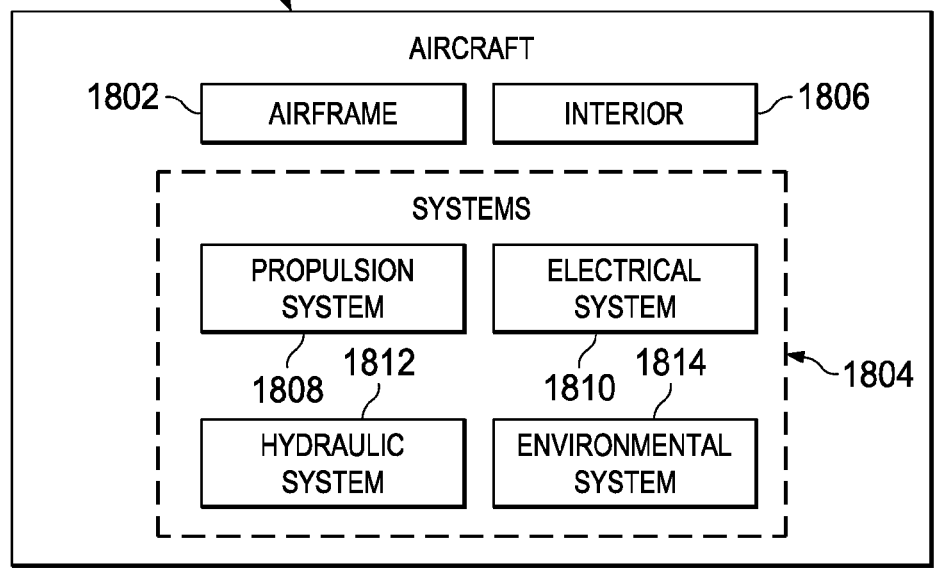

US 9,486,917 B2

MOBILE AUTOMATED ASSEMBLY TOOL FOR AIRCRAFT STRUCTURES

RELATED PROVISIONAL APPLICATION

This application claims the benefit of U.S. Provisional Patent Application Ser. No. 61/986,756, filed Apr. 30, 2014, and entitled "Mobile Automated Assembly Tool for Aircraft Structures."

CROSS-REFERENCE TO RELATED APPLICATIONS

This application is related to the following patent applications: entitled "Crawler Robot and Supporting Platform," Ser. No. 14/558,850, entitled "System and Method for Positioning an Automated Assembly Tool Relative to a Structure," Ser. No. 14/558,853, entitled "Metrology System for Positioning Assemblies," Ser. No. 14/558,034, entitled "Flexible Manufacturing System for Aircraft Structures," Ser. No. 14/558,867, entitled "Mobile Automated Overhead Assembly Tool for Aircraft Structures," Ser. No. 14/558,899, and entitled "Apparatus, System, and Method for Supporting a Wing Assembly," Ser. No. 14/558,834, filed of even date herewith, each assigned to the same assignee, and each incorporated herein by reference in its entirety.

BACKGROUND INFORMATION

1. Field

The present disclosure relates generally to aircraft and, in particular, to manufacturing aircraft structures. Still more particularly, the present disclosure relates to a method and apparatus for performing operations on an aircraft structure using an autonomous tooling system.

2. Background

Manufacturing aircraft structures may be a complex and time-consuming process. Thousands of parts may be designed and assembled to complete an aircraft structure. These parts may be progressively assembled by moving the aircraft structure to different locations in a manufacturing facility.

Various assembly operations are performed on the aircraft structure in each of the locations. These operations may be performed manually by human operators using handheld tools. For example, without limitation, drilling, countersinking, fastening, coupling, sealing, coating, inspecting, or other suitable types of operations may be performed on portions of an aircraft structure by the human operators. The human operators also may move the parts between locations to orient those parts relative to the aircraft structure.

To satisfy ergonomic considerations for the human operators, existing solutions may require assembly to be completed while the aircraft structure is in a vertical orientation. For instance, when assembling a wing, some currently used systems orient the wing with the trailing edge down and the leading edge up. Human operators maneuver about the wing to drill, inspect, and install fasteners in holes in the wing.

Once operations are performed on one portion of the aircraft structure, the aircraft structure must be reoriented so that the human operators can reach other portions of the aircraft structure. This process may involve disconnecting the aircraft structure from fixtures holding it in place, flipping the aircraft structure, and reconnecting the aircraft structure to the fixtures.

This assembly process may take more time or use more resources than desired. For example, the time needed to disconnect, flip, and reconnect the aircraft structure significantly decreases the production rate of the facility. As another example, performing operations using human operators may take more time or increase the cost of manufacturing more than desired, as countless labor hours are needed to assemble a single aircraft structure. Further, as more human operators are used, additional ergonomic considerations must be taken into account.

Other existing assembly solutions employ fixed robotic devices to perform operations on the aircraft structure. These robotic devices may be bolted to the floor of the manufacturing facility. With a bolted robotic device, the reach and orientation of an end effector on the robotic device may be limited. As a result, positioning and accuracy of the end effector may be more difficult than desired. Moreover, fixed robotic devices may not meet manufacturing requirements for more flexible and reconfigurable manufacturing facilities. Accordingly, there is a need for a method and apparatus that provide a more efficient, higher production rate process for assembling aircraft structures.

SUMMARY

In one illustrative embodiment, an assembly system for a structure may comprise a motion platform and a mobile platform. The motion platform may be configured to be positioned below a surface of a structure to perform an operation on the surface. The mobile platform may be configured to carry the motion platform across a floor of a manufacturing environment from a first location to a second location.

In another illustrative embodiment, a method for operating an assembly system may be provided. A motion platform may be carried across a floor of a manufacturing environment from a first location to a second location. The motion platform may be carried across the floor using a mobile platform. The motion platform may be positioned below a surface of a structure to perform an operation on the surface.

In another illustrative embodiment, an apparatus may comprise a mobile platform, a first movement system associated with the mobile platform, an end effector, a hexapod carried by the mobile platform, and a second movement system associated with the hexapod. The first movement system may be configured to drive the mobile platform across a floor of a manufacturing environment from a first location to a second location under a lower skin panel of a structure. The end effector may be configured to hold a set of tools. The end effector may be further configured to install a fastener in the lower skin panel using the set of tools. The hexapod may be configured to position the end effector relative to a surface of the lower skin panel. The second movement system may be configured to move the hexapod along a vertical axis toward the surface of the lower skin panel.

In still another illustrative embodiment, a method for installing a fastener in a lower skin panel of a structure may be provided. A mobile platform carrying a hexapod may be driven across a floor of a manufacturing environment from a first location to a second location using a movement system. An end effector may be positioned on the hexapod under the lower skin panel. The fastener may be installed in the lower skin panel.

Another illustrative embodiment may provide a method for positioning a tool on a surface. The tool may be moved relative to the surface to roughly position the tool within a selected region on the surface using a first movement system. The tool may be moved relative to the surface with at least one degree of freedom to precisely position the tool at a selected position within the selected region on the surface using a second movement system.

Yet another illustrative embodiment may provide a method for positioning a tool on a surface. The tool may be moved relative to the surface to roughly position the tool within a selected region on the surface using a first movement system. The tool may be moved relative to the surface with at least one degree of freedom to precisely position the tool at a selected position within the selected region on the surface using a second movement system. An element associated with the tool for performing an operation may be aligned at the selected position relative to the selected position using a third movement system.

In still another illustrative embodiment, a method for positioning an assembly system relative to a surface may be provided. The assembly system may be moved relative to the surface to roughly position the assembly system within a selected region on the surface using a first movement system. A motion platform may be moved relative to the surface with at least one degree of freedom to precisely position an end effector on the motion platform at a selected position within the selected region on the surface using a second movement system. A tool associated with the end effector for performing an operation may be aligned at the selected position relative to the selected position using the motion platform.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 17 is an illustration of a block diagram of an aircraft manufacturing and service method in accordance with an illustrative embodiment; and FIG. 18 is an illustration of a block diagram of an aircraft in which an illustrative embodiment may be implemented.

DETAILED DESCRIPTION

Figure 1:
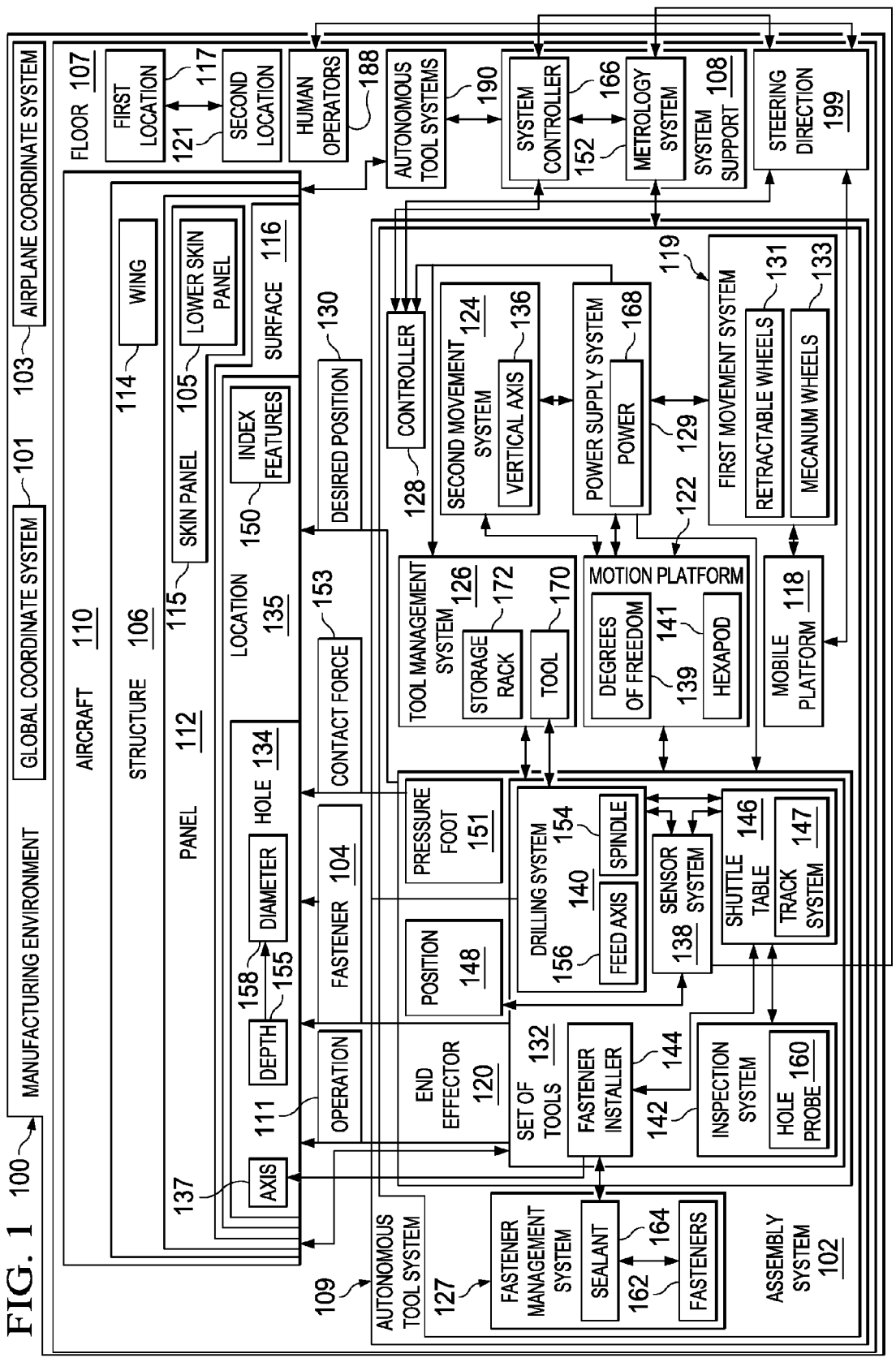
FIG. 1 is an illustration of a block diagram of a manufacturing environment in accordance with an illustrative embodiment.

The illustrative embodiments recognize and take into account one or more different considerations. For example, without limitation, the illustrative embodiments recognize and take into account that it may be desirable to automate the performance of manufacturing operations on an aircraft structure. In particular, the illustrative embodiments recognize and take into account that it may be desirable to have an automated device capable of performing drilling, measuring, inspecting, fastening, and other suitable operations on an aircraft structure.

The illustrative embodiments also recognize and take into account that it may be desirable to have a device capable of maneuvering under aircraft structures to perform manufacturing operations. For instance, the illustrative embodiments recognize and take into account that some locations on an aircraft structure are difficult for human operators to drill holes in a desired manner.

The illustrative embodiments recognize and take into account that drilling a skin panel of a wing from underneath may provide accuracy and ergonomic challenges. For example, without limitation, inconsistencies, such as incorrectly located holes or delamination, may be formed in holes drilled in the lower skin panel. As another example, a human operator may experience fatigue when installing fasteners in the skin panel. These challenges and others may result in the need for rework, discarding the panel or wing, an increase in the cost of manufacturing the wing more than desired, or some combination thereof.

Further, the illustrative embodiments recognize and take into account that it may be desirable to perform manufacturing operations on an aircraft structure without the use of a fixed monument fixture at different locations within the manufacturing facility. In this illustrative example, a "fixed monument fixture" is a structure that is immovably connected to the facility floor, wall, or other portion of the manufacturing facility. In other words, a fixed monument fixture may be a structure that is not configured to be moved in its entirety from one location to another location in the manufacturing facility without unfixing it from the facility floor, walls, or other un-moveable structure. For example, without limitation, a fixed monument fixture may hold a structure in position as operations are performed on the structure. These fixed monument fixtures may include robotic devices bolted to the facility floor, a fixed gantry system, or other structures.

The illustrative embodiments recognize and take into account that fixed monument fixtures reduce flexibility within a manufacturing facility. For instance, disconnecting an assembly from one fixed monument fixture and moving it to the next fixed monument fixture for further assembly may be difficult. This disconnect-move-reconnect time slows production rates and reduces manufacturing flexibility. Further, fixed monument fixtures may take up more room than desired, allow limited access to the aircraft structures being assembled, or both. Moreover, fixed monument fixtures may be more costly to manufacture, reconfigure, or maintain than desired. Similar problems arise with the use of fixed tool systems.

Thus, the illustrative embodiments provide a method and apparatus for performing operations on a structure. These operations may include installing a fastener in the structure. An assembly system comprises a mobile platform and a motion platform. The motion platform is configured to be positioned below a surface of a structure to perform an operation on the surface. The mobile platform is configured to carry the motion platform across a floor of a manufacturing environment from a first location to a second location.

Turning now to FIG. 1, an illustration of a block diagram of a manufacturing environment is depicted in accordance with an illustrative embodiment. In this depicted example, manufacturing environment 100 is an environment in which assembly system 102 may be used to install fastener 104 in structure 106. Manufacturing environment 100 may have floor 107.

As depicted, manufacturing environment 100 may include structure 106, autonomous tool system 109, and system support 108. In this illustrative example, structure 106 may be an object in aircraft 110. For example, without limitation, structure 106 may be incorporated in at least one of a wing, a fuselage, a horizontal stabilizer, a door, a housing, an engine, or other suitable structures.

In this illustrative example, structure 106 may take the form of panel 112 of wing 114 in aircraft 110. Panel 112 may be skin panel 115 in this illustrative example. For instance, panel 112 may be a lower skin panel 105 for wing 114. In other illustrative examples, panel 112 may be a skin panel for a vertical stabilizer in aircraft 110. Other examples for panel 112 may include panels for installation on a fuselage, horizontal stabilizer, flap, spoiler, slat, nacelle or some other aircraft structure. Panel 112 may have surface 116. Surface 116 may be referred to as a "work surface" in some illustrative examples.

In this depicted example, autonomous tool system 109 may be configured to perform operation 111 on panel 112. Operation 111 may be referred to as an assembly operation in this illustrative example. For instance, assembly system 102 may be configured to perform at least one of a drilling operation, a fastening operation, an inspection operation, a measurement operation, a cleaning operation, a sealing operation, a data collection operation, or other suitable types of operation 111.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this illustrative example, autonomous tool system 109 may take the form of assembly system 102. In this manner, assembly system 102 may be referred to as an autonomous tool or an automated tool system. Assembly system 102 may be configured to install fastener 104 in surface 116 of panel 112.

Assembly system 102 may include a number of components. As used herein, a "number of" items may be one or more items. In this illustrative example, a number of components may be one or more components.

One or more components in assembly system 102 may move with at least one degree of freedom up to six degrees of freedom or more. For instance, each component may move with at least one degree of translational freedom or at least one degree of rotational freedom, but can have up to three degrees of translational freedom, up to three degrees of rotational freedom, or both. Each components may move with at least one degree of freedom independently of other components in assembly system 102 in some examples.

Assembly system 102 may be located and positioned based on at least one of global coordinate system 101 and airplane coordinate system 103, or more particular coordinate systems like wing, flap, spoiler, stabilizer, slat, fuselage, or some other structure or even component systems like spars, ribs, frames, or some other component. Global coordinate system 101 may be a reference coordinate system for manufacturing environment 100.

Airplane coordinate system 103 may represent a reference coordinate system in which airplane parts are located in three-dimensional space. Airplane coordinate system 103 may be based on an origin or reference point in aircraft 110. Using at least one of global coordinate system 101 and airplane coordinate system 103, assembly system 102 and the components within assembly system 102 may be crudely and precisely positioned relative to structures within manufacturing environment 100. As depicted, assembly system 102 may comprise mobile platform 118, first movement system 119, end effector 120, motion platform 122, second movement system 124, tool management system 126, fastener management system 127, controller 128, and power supply system 129.

In this illustrative example, mobile platform 118 may be a mechanical device that holds the components within assembly system 102. For instance, mobile platform 118 may be configured to carry motion platform 122 to perform operation 111.

In this illustrative example, when an item is "mobile," the item may be able to move across floor 107 in manufacturing environment 100. In other words, the item is not fixed to a particular location in manufacturing environment 100.

A mobile item also may be drivable. As used herein, an item that is "drivable" may be an item that can drive to different positions by moving or being guided. Driving an item may include moving the item by at least one of translating the item with at least one degree of translational freedom or rotating the item with at least one degree of rotational freedom. Further, driving an item may include moving an entirety of the item and all of the components that make up the item together in unison. A drivable item may be capable of autonomously driving to different locations. In other words, the item may have autonomous or semi-autonomous drive capability to move in its entirety from one location to another location relative to floor 107 in manufacturing environment 100.

In other cases, a drivable item may be driven by some other system. For example, a controller, a movement system, a human operator, or some other type of device or operator may drive an item. In this manner, a drivable item may be electronically driven, mechanically driven, electromechanically driven, manually driven, or driven in some other manner.

In this illustrative example, mobile platform 118 and the components associated with mobile platform 118 are not fixed in a location. Rather, the entirety of mobile platform 118 may move across floor 107 of manufacturing environment 100. For example, without limitation, mobile platform 118 may use first movement system 119 to drive from first location 117 to second location 121 on floor 107 of manufacturing environment 100.

As illustrated, first movement system 119 may be physically associated with mobile platform 118. A first component, such as first movement system 119, may be considered to be physically associated with a second component, such as mobile platform 118, by being secured to the second component, bonded to the second component, mounted to the second component, welded to the second component, fastened to the second component, connected to the second component in some other suitable manner, or a combination thereof. The first component also may be connected to the second component using a third component. Further, the first component may be considered to be associated with the second component by being formed as part of the second component, as an extension of the second component, or a combination thereof.

In this depicted example, first movement system 119 may comprise a number of components configured to drive mobile platform 118 from first location 117 to second location 121. For instance, first movement system 119 may include wheels, a track system, pulleys, lift jacks attached to the corners of mobile platform 118, or other suitable movement devices. In this manner, first movement system 119 provides crude positioning for mobile platform 118.

In an illustrative example, first movement system 119 may include retractable wheels 131. Retractable wheels 131 may be retracted to lower mobile platform 118 to a floor of manufacturing environment 100. Lowering mobile platform 118 to floor 107 of manufacturing environment 100 may increase the stability of assembly system 102 during installation of fastener 104. After the installation of fastener 104 is completed, retractable wheels 131 may be extended to lift mobile platform 118 from floor 107 and move mobile platform 118 from first location 117 to second location 121 on floor 107.

In this depicted example, first movement system 119 may include mecanum wheels 133. Mecanum wheels 133 allow mobile platform 118 to achieve omni-directional movement. In other words, mecanum wheels 133 may move mobile platform 118 forward and backward, as well as side to side.

In some illustrative examples, mecanum wheels 133 also may be retractable or may lock to substantially prevent undesired movement of mobile platform 118. In other illustrative examples, first movement system 119 may include holonomic wheels, another type of omni-wheels, casters, other suitable movement devices, or a combination thereof. These types of wheels may or may not be retractable in an illustrative example.

As depicted, end effector 120 may be a device to which set of tools 132 are attached. In particular, end effector 120 may be configured to hold set of tools 132. Set of tools 132 may be used to install fastener 104 in panel 112.

As used herein, a "set" of items may be one or more items. In this illustrative example, set of tools 132 may be one or more tools. When two or more tools are present in set of tools 132, the tools also may be referred to a group of tools, a plurality of tools, simply "tools," or the like.

In this illustrative example, motion platform 122 may be a device configured to position end effector 120 in desired position 130 relative to surface 116. In this illustrative example, desired position 130 may include at least one of a location or an orientation for end effector 120 in three-dimensional space relative to panel 112 of structure 106.

Motion platform 122 may move set of tools 132 on end effector 120 to desired position 130 relative to location 135 on surface 116 of panel 112 to install fastener 104. Specifically, motion platform 122 may be configured to position set of tools 132 on end effector 120 relative to surface 116 of panel 112 at location 135. For example, without limitation, motion platform 122 may position set of tools 132 perpendicular to location 135, parallel to location 135, co-linear to a central axis of location 135 for fastener 104, or in some other manner.

Motion platform 122 provides fine positioning for end effector 120 relative to location 135. Location 135 may be a desired location for drilling hole 134 for fastener 104.

When set of tools 132 are positioned relative to location 135 on surface 116 on panel 112, fastener 104 may be installed in a desired manner. For instance, positioning set of tools 132 perpendicular to surface 116 at location 135 may allow set of tools 132 to drill hole 134 in location 135 along axis 137.

Axis 137 may run perpendicular to surface 116 at location 135 in some cases. Drilling hole 134 in this manner may provide a desired alignment for fastener 104 when inserted into hole 134. In another illustrative example, positioning set of tools 132 perpendicular to surface 116 at location 135 may allow set of tools 132 to drill hole 134 without forming a crack, delamination, or other out of tolerance inconsistencies in panel 112. In other examples, axis 137 may be at an angle.

In this depicted example, motion platform 122 may take various forms. Motion platform 122 takes the form of hexapod 141 in this illustrative example. In other illustrative examples, without limitation, motion platform 122 may take the form of a Stewart platform or other suitable types of motion platforms.

Motion platform 122 may provide degrees of freedom 139 of movement for end effector 120 in this illustrative example. Degrees of freedom 139 may refer to the movement of end effector 120 in three-dimensional space. For instance, motion platform 122 may be configured to provide seven degrees of freedom 139 for end effector 120.

As illustrated, second movement system 124 may be physically associated with motion platform 122. Second movement system 124 may comprise a number of components configured to move motion platform 122 along vertical axis 136 toward surface 116 of panel 112.

Vertical axis 136 may be an axis substantially perpendicular to surface 116 at location 135 in this illustrative example. Set of tools 132 on end effector 120 may move along vertical axis 136 as motion platform 122 moves.

In this illustrative example, set of tools 132 may comprise a number of different types of tools. Set of tools 132 may include sensor system 138, drilling system 140, inspection system 142, and fastener installer 144.

In an illustrative example, set of tools 132 may be positioned on shuttle table 146 on end effector 120. Shuttle table 146 may hold set of tools 132 and move set of tools 132.

Shuttle table 146 may be configured to move set of tools 132 relative to surface 116 of panel 112 along track system 147. As an example, shuttle table 146 may move set of tools 132 back and forth along an axis parallel to surface 116 of panel 112 using track system 147.

As illustrated, sensor system 138 may comprise various sensing devices configured to identify at least one of panel 112, position 148 of end effector 120 relative to location 135 on surface 116 of panel 112, or location 135 on surface 116 of panel 112 to drill hole 134 for fastener 104. For example, without limitation, sensor system 138 may include a camera, a proximity sensor, a magnetic through-skin sensor, or some other suitable type of sensor.

After using at least one of first movement system 119 and second movement system 124, position 148 of end effector 120 may be verified using sensor system 138 in set of tools 132. In this illustrative example, position 148 may include a current location, an orientation, or both for end effector 120 relative to surface 116 of panel 112. Position 148 may be compared to desired position 130 and adjustments may be made.

In some illustrative examples, sensor system 138 may be configured to identify position 148 of end effector 120 relative to location 135 on surface 116 based on index features 150 of surface 116. Index features 150 may be pre-determined reference points on surface 116. These index features 150 may take the form of at least one of a magnet, a sensor, a graphical indicator, a radio-frequency identification tag, a target, or some other suitable type of index feature. End effector 120 may be moved along surface 116 based on the position of index features 150. Index features 150 also may be used to identify where to drill hole 134 in surface 116.

In some other illustrative examples, sensor system 138 may communicate with metrology system 152 in system support 108 to identify position 148 of end effector 120. Metrology system 152 may be one or more measurement devices in this illustrative example.

System support 108 with metrology system 152 may be configured to support operation of assembly system 102. Specifically, system support 108 may provide navigation, utilities, position information, task assignment, and other suitable types of resources.

As an example, system support 108 may provide navigation for assembly system 102. As another example, metrology system 152 may be configured to make measurements about the position of structure 106 in some illustrative examples. In some cases, system support 108 may provide electricity, air, hydraulic fluid, water, vacuum, or other utilities to assembly system 102. System support 108 may be configured to provide these resources to various other devices located in manufacturing environment 100 as well.

In this illustrative example, pressure foot 151 may be connected to end effector 120. Pressure foot 151 may be a pressure-sensing device in this illustrative example. Pressure foot 151 may be the first portion of end effector 120 to contact surface 116 of panel 112.

In this illustrative example, pressure foot 151 may be configured to identify contact force 153 between pressure foot 151 and surface 116 of panel 112. Contact force 153 may be an amount of force exerted on surface 116 by end effector 120.

Pressure foot 151 may sense contact force 153 using a load cell or some other type of load sensor. An indication of contact force 153 may be desirable to reduce the risk of damage to at least one of surface 116, end effector 120, or both.

Pressure foot 151 may be manually or automatically removed and replaced to optimize the area of contact with panel 112. For instance, pressure foot 151 may be interchanged with a pressure foot having a different diameter, shape, or other feature. In some illustrative examples, pressure foot 151 may be designed to safely break away in the event of an undesired encounter with panel 112 to avoid damage of panel 112, components within assembly system 102, or both.

A desired contact force 153 may be needed in this illustrative example. For instance, contact force 153 may be used to clamp panel 112 to the substructure for panel 112 before installing fastener 104. As an example, panel 112 may need to be pressed against a rib, spar, or load bearing fitting for proper installation of fastener 104. Thus, a desired contact force 153 may be needed to achieve these results.

Once end effector 120 and set of tools 132 are in position, assembly system 102 may drill hole 134 in location 135 on surface 116 of panel 112. Assembly system 102 may drill hole 134 in location 135 on surface 116 using drilling system 140 in this illustrative example.

Drilling system 140 may be configured to drill different types of holes in location 135 on surface 116. For example, without limitation, hole 134 may take the form of a cylindrical hole, a conical hole, a countersunk hole, a counterbored hole, a spot face, a blind hole, or some other type of hole in this illustrative example.

Drilling system 140 may include spindle 154 and feed axis 156. In this illustrative example, spindle 154 may comprise a number of mechanical parts configured to rotate to drill hole 134. As an example, spindle 154 may include a drill bit on an end of spindle 154. Spindle 154 may rotate the drill bit to drill hole 134 with depth 155 and diameter 158 in a desired manner. In another example, spindle 154 may rotate a cutter. Spindle 154 may be operated using hydraulic power, pneumatic power, electricity, or some other energy source.

In some cases, the mechanical parts in spindle 154 may be changed based on the requirements for hole 134. For instance, the drill bit on spindle 154 may be changed to change at least one of depth 155 or diameter 158 of hole 134. For example, a thinner bit may be used to decrease diameter 158 of hole 134. In other illustrative examples, a longer cutter may be used to increase depth 155 of hole 134.

As depicted, feed axis 156 may be perpendicular to surface 116 at location 135. In other examples, depending on the particular implementation, feed axis 156 may not be perpendicular to surface 116.

Feed axis 156 may include various mechanical parts configured to move spindle 154 relative to surface 116 at location 135 to drill hole 134. For example, without limitation, feed axis 156 may include a platform, a track system, a load cell, a roller bearing, and other mechanical parts. Feed axis 156 may move spindle 154 toward location 135 to drill hole 134. When hole 134 is completed, feed axis 156 may move spindle 154 in the opposite direction.

After drilling hole 134, assembly system 102 may inspect hole 134. Assembly system 102 may use inspection system 142 to inspect hole 134. Inspection system 142 may inspect at least one of depth 155 or diameter 158 of hole 134. Inspection system 142 may inspect diameter 158 of hole 134 using hole probe 160.

In this illustrative example, hole probe 160 may be an elongate device configured to measure diameter 158 of hole 134. In some illustrative examples, hole probe 160 may be inserted into hole 134 to determine if hole 134 has a desired diameter. Depending on the type of hole 134 formed, inspection system 142 may be used to inspect other parameters for hole 134. For example, without limitation, inspection system 142 may be used to inspect at least one of a countersink depth, countersink angle, countersink normality to location 135, the normality of hole 134 to location 135, a countersink diameter, a grip length, or some other parameter for hole 134.

Hole probe 160 may be removed to place a different probe into inspection system 142. Different probes may be placed into inspection system 142 to inspect different diameters. In some illustrative examples, hole probe 160 may be replaced with a thinner probe to inspect hole 134 having a smaller diameter. In other illustrative examples, hole probe 160 may be replaced with a thicker probe to inspect hole 134 having a larger diameter.

After inspecting hole 134, assembly system 102 may place fastener 104 into hole 134. Fastener 104 may join panel 112 to a part positioned against panel 112. For example, without limitation, fastener 104 may join panel 112 to a rib, a spar, or some other structural member in wing 114. In another illustrative example, fastener 104 may join a skin panel to panel 112.

In this depicted example, fastener 104 may take the form of one of a rivet, a lockbolt, a bolt, a hexdrive, and other suitable types of fasteners. Fastener 104 may be placed in hole 134 using fastener installer 144. In this illustrative example, fastener installer 144 may be a mechanical device configured to apply a force to fastener 104 to insert fastener 104 in hole 134. In some illustrative examples, fastener installer 144 may accommodate several diameters of fasteners.

Fastener management system 127 may hold fasteners 162 and other parts for fastener installer 144. Fastener management system 127 may be configured to hold several different diameters and grip lengths of fasteners 162. Fastener management system 127 may also perform other functions. For example, fastener management system 127 may perform at least one of washing fasteners 162 to remove any residue, applying sealant 164 to fasteners 162, inspecting fastener and sealant application, supplying one of fasteners 162 having sealant 164 to fastener installer 144, or other desirable actions.

In this illustrative example, sealant 164 may take the form of a polymeric material, a dielectric material, paint, or some other type of coating material. Sealant 164 may be configured to provide electromagnetic effect protection for fasteners 162, seal hole 134, or perform various other functions.

As illustrated, tool management system 126 may include a number of parts configured to exchange tool 170 between storage rack 172 and end effector 120. Tool 170 may be one of set of tools 132 configured for use on end effector 120. In this illustrative example, storage rack 172 may be a structure used to hold tool 170 and other tools when not used by end effector 120.

Tool management system 126 may place tool 170 on end effector 120 when tool 170 is needed. In a similar fashion, tool management system 126 may take a tool that is no longer needed off end effector 120 and place it in storage rack 172.

In this illustrative example, controller 128 may be a device configured to control operation of assembly system 102. Controller 128 may be in communication with the various components in assembly system 102, as well as system controller 166 and metrology system 152 in system support 108.

When one component is "in communication" with another component, the two components may be configured to send signals back and forth over a communications medium. For example, without limitation, controller 128 may communicate with system controller 166 wirelessly over a network.

In another illustrative example, controller 128 may communicate with motion platform 122 via a wired or wireless connection.

Controller 128 may be further configured to prevent undesired encounters with human operators 188, autonomous tool systems 190, or both in manufacturing environment 100. In this illustrative example, autonomous tool systems 190 may be other devices configured to work on panel 112. In some examples, autonomous tool systems 190 may be referred to as automated tools.

Controller 128 may use system support 108 to determine the location of human operators 188 and maneuver assembly system 102 around human operators 188. Controller 128 also may be configured to shut down assembly system 102 if human operators 188 are too close to assembly system 102. In still another illustrative example, controller 128 may use system support 108 to determine the location of autonomous tool systems 190 within manufacturing environment 100 to avoid undesired encounters between assembly system 102 and autonomous tool systems 190.

In this illustrative example, at least one of controller 128 and system controller 166 may be implemented in software, hardware, firmware, or a combination thereof. When software is used, the operations performed by the controller may be implemented using, for example, without limitation, program code configured to run on a processor unit. When firmware is used, the operations performed by the controller may be implemented using, for example, without limitation, program code and data and stored in persistent memory to run on a processor unit.

When hardware is employed, the hardware may include one or more circuits that operate to perform the operations in controller. Depending on the implementation, the hardware may take the form of a circuit system, an integrated circuit, an application specific integrated circuit (ASIC), a programmable logic device, or some other suitable type of hardware device configured to perform any number of operations.

With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In some illustrative examples, the operations, processes, or both performed by controller 128 and system controller 166 may be performed using organic components integrated with inorganic components. In some cases, the operations, processes, or both may be performed entirely by organic components, excluding a human being. As one illustrative example, circuits in organic semiconductors may be used to perform these operations, processes, or both.

As illustrated, assembly system 102 also may have power supply system 129. Power supply system 129 may include a power source configured to provide power to assembly system 102. This power source may take the form of a battery, a solar cell, a pressurized air generator, a fuel cell, a combustion engine, a cable to an external power source, or some other suitable device. Power supply system 129 may be configured to supply power 168 to assembly system 102 such that utility cables or other connections may not be needed to move assembly system 102 relative to surface 116 of panel 112.

In this illustrative example, steering direction 199 may be provided for assembly system 102. As an example, steering direction 199 may be provided for mobile platform 118 as mobile platform 118 moves through manufacturing environment 100. Steering direction 199 may take the form of commands, instructions, path generation, physically changing the direction of movement of mobile platform 118, and other methods of guidance for mobile platform 118. In this illustrative example, steering direction 199 may dynamically change as conditions within manufacturing environment 100 change.

Steering direction 199 may be provided by at least one of controller 128, system controller 166, human operators 188, or some other suitable device. As an example, system controller 166 may send commands to steer mobile platform 118. In yet another example, one or more of human operators 188 may steer mobile platform 118 by physically changing its direction. In other illustrative examples, mobile platform 118 may steer itself, not under the direction of a controller.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, first movement system 119 may include at least one of an air system, retractable tracks, or other devices in addition to or in place of retractable wheels 131, mecanum wheels 133, or both. In some illustrative examples, a locking mechanism also may be included. In another illustrative example, gravity may hold mobile platform 118 in place.

In still other illustrative examples, set of tools 132 may include tools in addition to or in place of the ones shown in FIG. 1. For example, a vision system may be positioned on end effector 120. The vision system may be used to find index features 150 in some illustrative examples. In still other illustrative examples, a cleaning system, cooling system, or other device also may be positioned on end effector 120.

Figure 2:
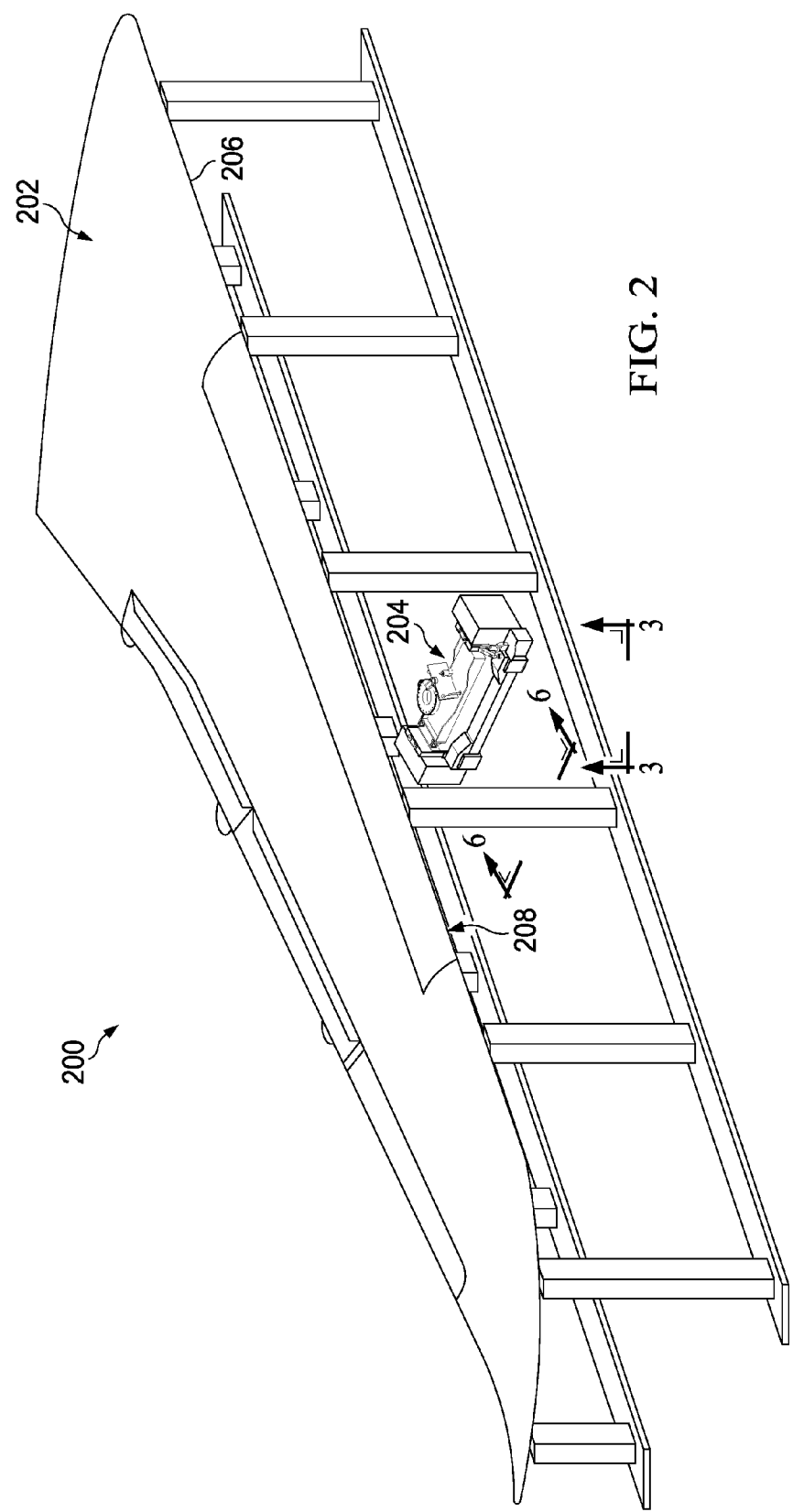
FIG. 2 is an illustration of a manufacturing environment in accordance with an illustrative embodiment.

Turning next to FIG. 2, an illustration of a manufacturing environment is depicted in accordance with an illustrative embodiment. Manufacturing environment 200 may be an example of a physical implementation for manufacturing environment 100 in FIG. 1.

In this depicted example, manufacturing environment 200 may include wing assembly 202. Wing assembly 202 may be an example of a physical implementation for wing 114 shown in block form in FIG. 1 as wing 114 is being assembled.

As depicted, assembly system 204 may be positioned below wing assembly 202. In this illustrative example, assembly system 204 may be positioned below surface 206 of panel 208 of wing assembly 202. For instance, panel 208 may be a lower skin panel for wing assembly 202. Surface 206 and panel 208 may be examples of physical implementations for surface 116 and panel 112, respectively, shown in FIG. 1.

Figure 3:
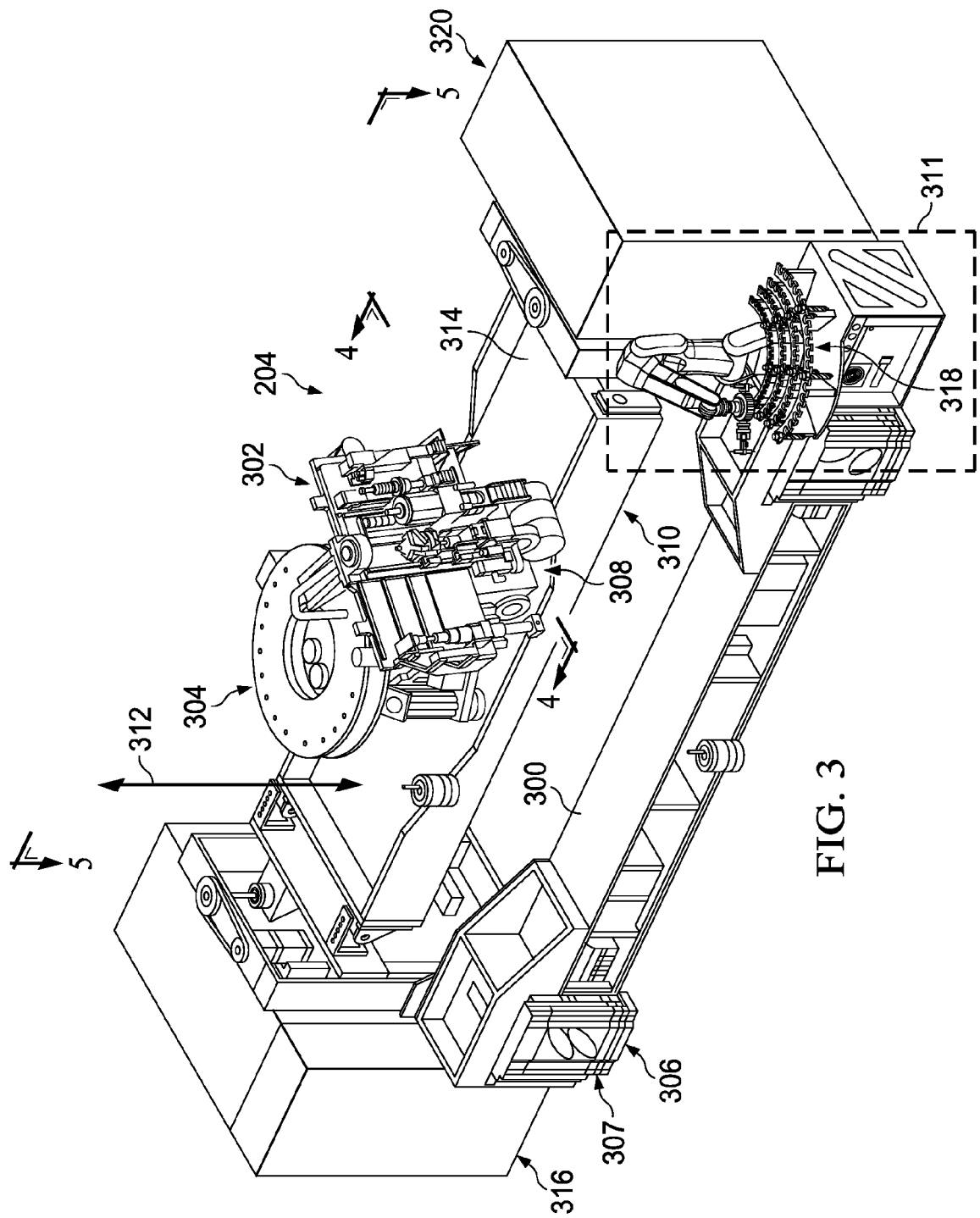
FIG. 3 is an illustration of an isometric view of an assembly system in accordance with an illustrative embodiment.

In FIG. 3, an illustration of an isometric view of assembly system 204, shown in the direction of lines 3-3 in FIG. 2, is depicted in accordance with an illustrative embodiment. In this depicted example, an enlarged view of assembly system 204 is shown such that components within assembly system 204 may be seen in greater detail.

As depicted, assembly system 204 may include mobile platform 300, end effector 302, and motion platform 304. Mobile platform 300, end effector 302, and motion platform 304 may be examples of physical implementations for mobile platform 118, end effector 120, and motion platform 122, respectively, shown in block form in FIG. 1.

In this illustrative example, mobile platform 300 may move relative to wing assembly 202 shown in FIG. 2 using first movement system 306. First movement system 306 may take the form of retractable wheels 307 in this illustrative example. Retractable wheels 307 retract to temporarily plant assembly system 204 in place while installing a fastener (not shown in this view) in surface 206 of panel 208 in FIG. 2. First movement system 306 with retractable wheels 307 may be an example of a physical implementation for first movement system 119 with retractable wheels 131 shown in block form in FIG. 1.

As illustrated, end effector 302 may be connected to motion platform 304. Motion platform 304 may move end effector 302 relative to surface 206 of panel 208. End effector 302 may hold set of tools 308. Set of tools 308 may be used to install the fastener in panel 208. Set of tools 308 may be an example of a physical implementation for set of tools 132 in FIG. 1.

In this illustrative example, second movement system 310 may move motion platform 304 and end effector 302 along vertical axis 312. Second movement system 310 may include platform 314 in this illustrative example. Platform 314 may move motion platform 304 back and forth along vertical axis 312. Second movement system 310 and vertical axis 312 may be examples of physical implementations for second movement system 124 and vertical axis 136, respectively, shown in FIG. 1.

As depicted, assembly system 204 also may include fastener management system 316, tool management system 318, and controller 320. Fastener management system 316, tool management system 318, and controller 320 may be examples of physical implementations for fastener management system 127, tool management system 126, and controller 128, respectively, shown in block form in FIG. 1.

In this illustrative example, fastener management system 316 and tool management system 318 may be configured to assist set of tools 308 in installing the fastener. For example, without limitation, fastener management system 316 may supply the fastener to set of tools 308 for installation. In another illustrative example, tool management system 318 may supply a drill bit with a desired diameter to set of tools 308 for use. Tool management system 318 is shown in section 311.

In this depicted example, controller 320 may be configured to control the operation of each of the components in assembly system 204. For instance, controller 320 may be configured to retract and extend retractable wheels 307. As another example, controller 320 may send commands to move platform 314 along vertical axis 312 in a desired manner. In another illustrative example, controller 320 may communicate with tool management system 318 to provide a desired tool for use on end effector 302.

In some cases, controller 320 may receive commands from a system controller (not shown in this view) to navigate assembly system 204 through manufacturing environment 200. Alternatively, controller 320 may autonomously drive assembly system 204. In still another illustrative example, assembly system 204 may be non-autonomously driven from one location to another location.

Steering direction may be provided as assembly system 204 moves through manufacturing environment 200. Steering direction may be provided by at least one of controller 320, the system controller, a human operator, or some other suitable device. In other illustrative examples, mobile platform 300 may steer itself, not under the direction of a controller.

Figure 4:
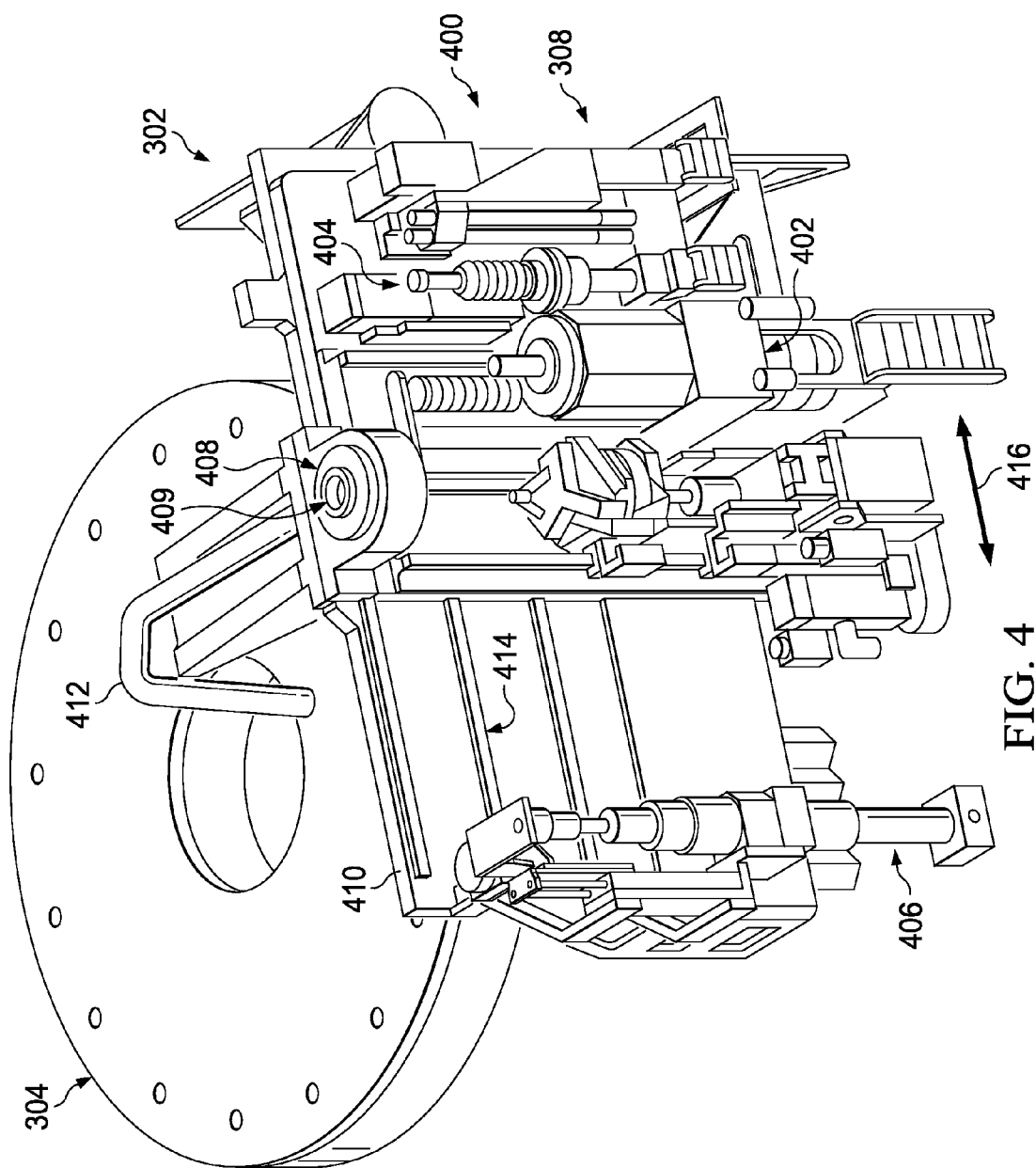
FIG. 4 is an illustration of an end effector and a set of tools in accordance with an illustrative embodiment.

With reference now to FIG. 4, an illustration of end effector 302 and set of tools 308 shown in the direction of lines 4-4 in FIG. 3 is depicted in accordance with an illustrative embodiment. In this view, an enlarged view of end effector 302 is shown such that the components within set of tools 308 and end effector 302 are seen in greater detail.

As depicted, set of tools 308 may include sensor system 400, drilling system 402, inspection system 404, and fastener installer 406. Sensor system 400, drilling system 402, inspection system 404, and fastener installer 406 may be examples of physical implementations for sensor system 138, drilling system 140, inspection system 142, and fastener installer 144, respectively, shown in block form in FIG. 1.

Pressure foot 408 may also be seen in this view. In an illustrative example, pressure foot 408 may be the first contact point with surface 206 of panel 208 in FIG. 2. Pressure foot 408 may be an example of a physical implementation for pressure foot 151 in FIG. 1.

In this depicted example, pressure foot 408 may include channel 409. Channel 409 may be an opening in pressure foot 408. Each tool in set of tools 308 may be extended and retracted through channel 409 to perform operations on panel 208.

A tool in set of tools 308 may move to align with channel 409 of pressure foot 408 before being extended. As operations are performed on panel 208, pressure foot 408 may remain in contact with surface 206 of panel 208 to provide a desired clamping force and alignment.

As illustrated, end effector 302 may include shuttle table 410 and connector 412. Shuttle table 410 may provide structural support for set of tools 308. Shuttle table 410 also may move set of tools 308 along track system 414.

In this illustrative example, shuttle table 410 may move set of tools 308 back and forth in the direction of arrow 416 using track system 414. Shuttle table 410 and track system 414 may be examples of physical implementations for shuttle table 146 and track system 147 shown in FIG. 1. Connector 412 may be an umbilical cable configured to connect set of tools 308 with various utilities in this illustrative example.

Figure 5:
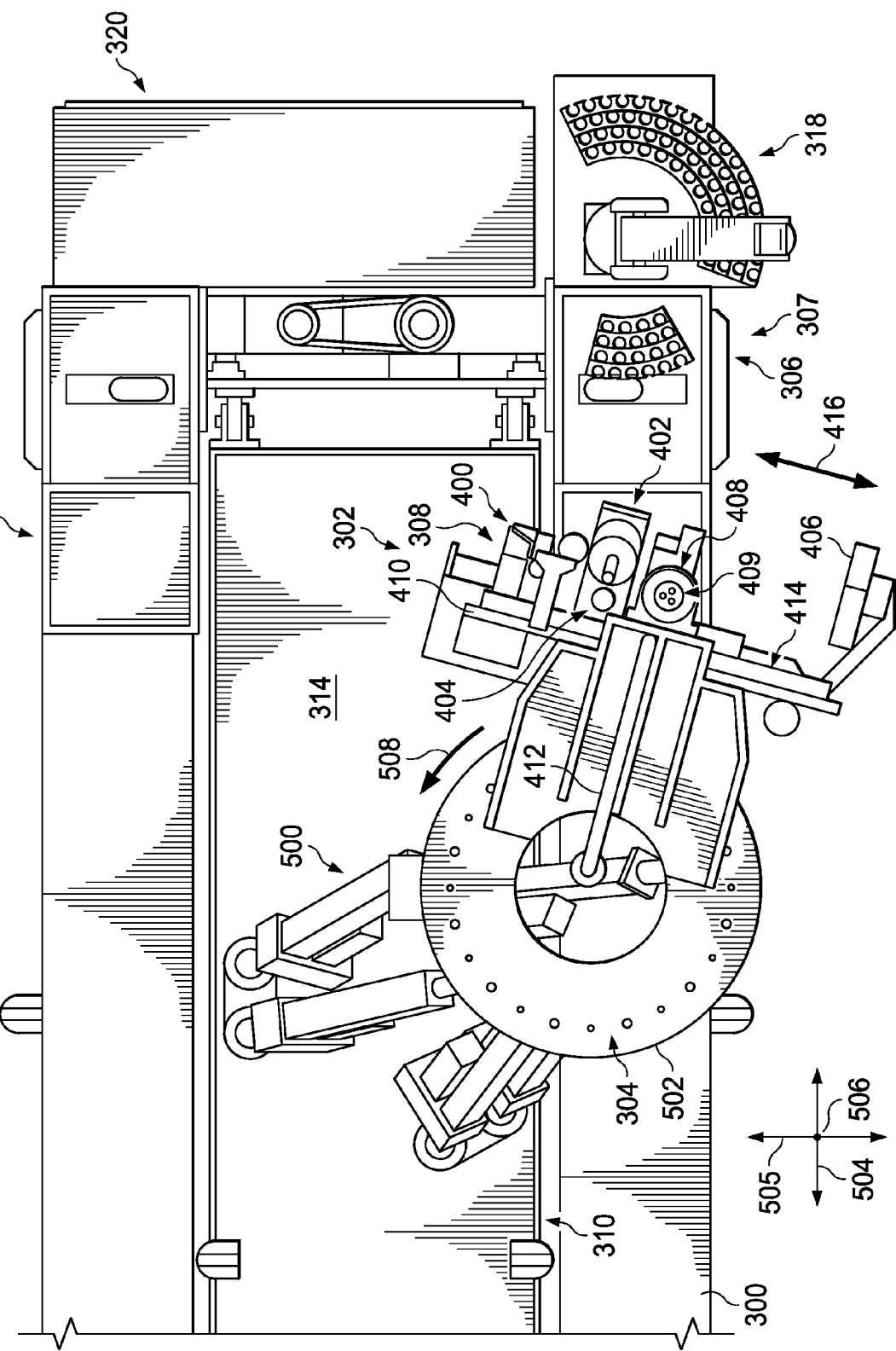
FIG. 5 is an illustration of a top view of an assembly system in accordance with an illustrative embodiment.

In FIG. 5, an illustration of a top view of assembly system 204 shown in the direction of lines 5-5 in FIG. 3 is depicted in accordance with an illustrative embodiment. In this illustrative example, motion platform 304 may include linear actuators 500 and disc actuator 502. Disc actuator 502 is connected to end effector 302 in this illustrative example. The motion of linear actuators 500 or disc actuator 502 may result in movement of end effector 302.

Linear actuators 500 may be configured to extend and retract individually to move disc actuator 502 with six degrees of freedom in this illustrative example. Specifically, linear actuators 500 may be configured to translate disc actuator 502 in x-axis 504, y-axis 505, and z-axis 506 and rotate disc actuator 502 about x-axis 504, y-axis 505, and z-axis 506.

In this illustrative example, disc actuator 502 may be configured to rotate in the direction of arrow 508 to move end effector 302 about the circumference of disc actuator 502. In this manner, motion platform 304 provides an additional degree of freedom of movement for end effector 302. In other words, linear actuators 500 with disc actuator 502 may provide a total of seven degrees of freedom of movement for end effector 302. Linear actuators 500, disc actuator 502, or both may move individually or simultaneously to place end effector 302 in a desired position relative to surface 206 of panel 208 shown in FIG. 2.

FIGS. 6-12 show illustrations of assembly system 204 performing operations in accordance with an illustrative embodiment. Specifically, FIGS. 6-12 show assembly system 204 installing a fastener in surface 206 of panel 208 in the direction of lines 6-6 in FIG. 2.

Figure 6:
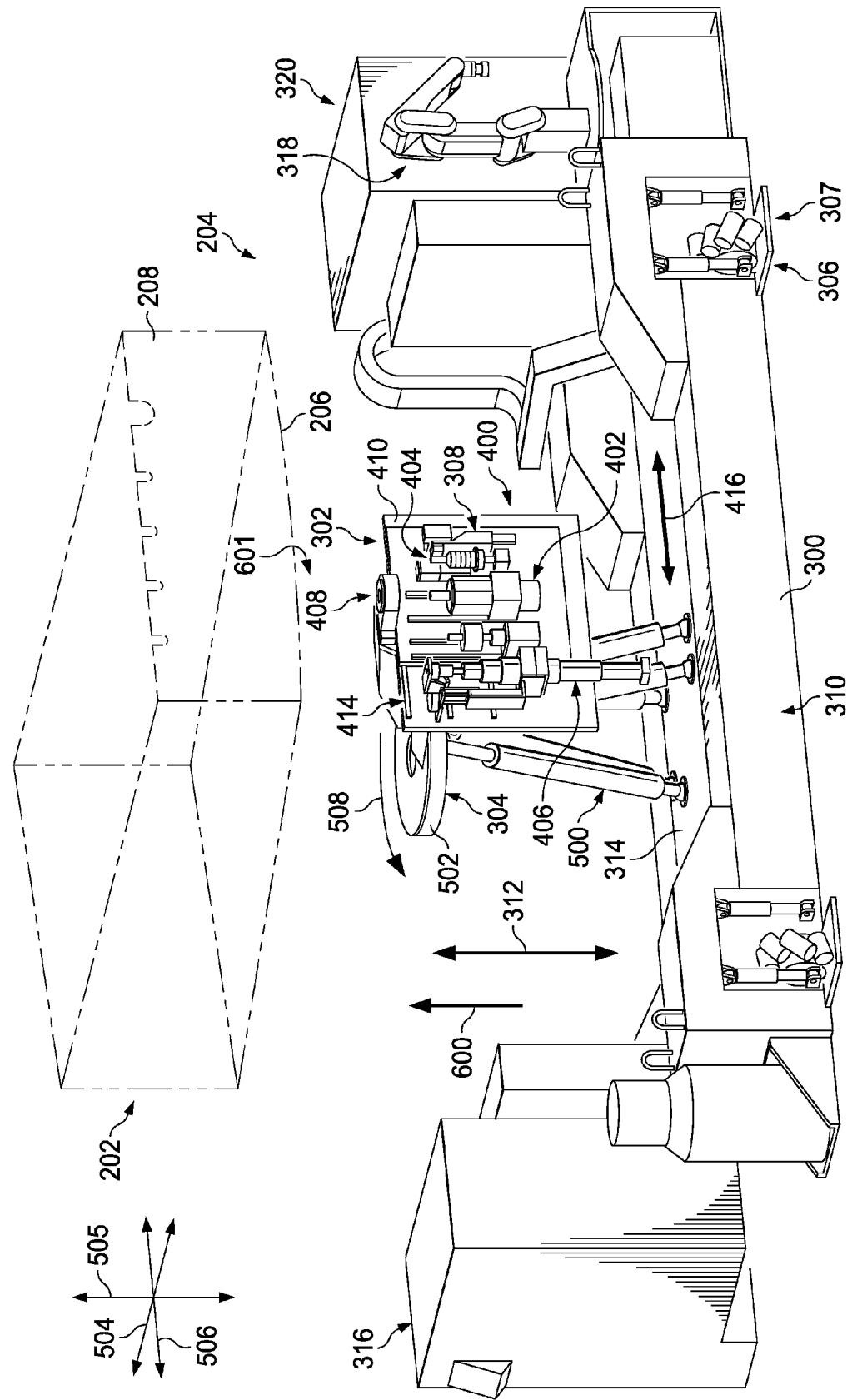
FIGS. 6-12 are illustrations of an assembly system performing operations in accordance with an illustrative embodiment.

Turning to FIG. 6, mobile platform 300 has been placed in a desired position relative to location 601 on surface 206 of panel 208 using first movement system 306. Location 601 may be a location for a hole (not shown in this view) and is an example of a physical implementation for location 135 on surface 116 in FIG. 1. Second movement system 310 may move motion platform 304 in the direction of arrow 600 along vertical axis 312 toward surface 206.

Figure 7:
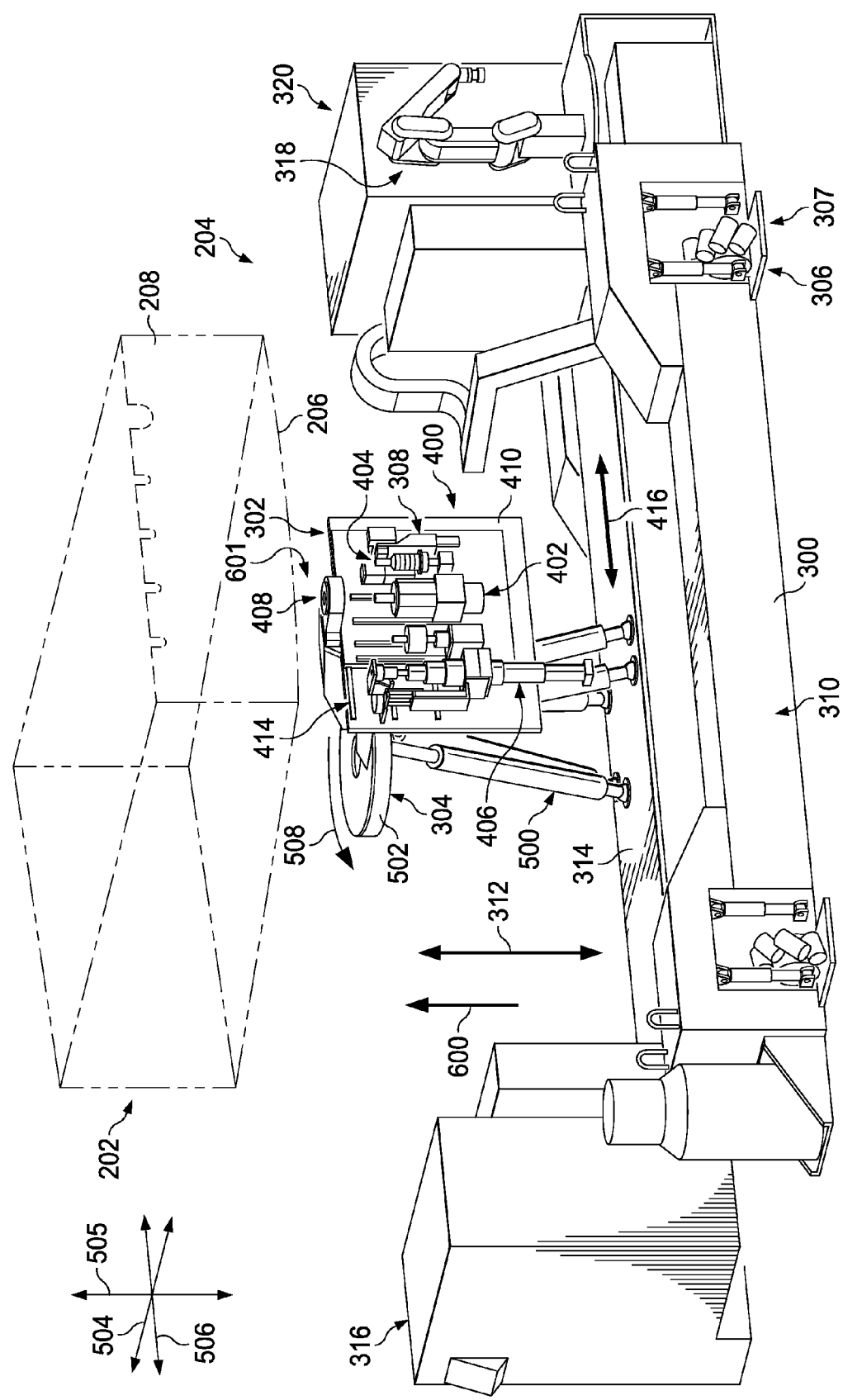

In FIG. 7, motion platform 304 has moved in the direction of arrow 600 in FIG. 6. Sensor system 400 may be used to determine location 601 for a hole to be drilled (not shown in this view). Motion platform 304 may then be used to position end effector 302 with set of tools 308 perpendicular to location 601 on surface 206 of panel 208 in this illustrative example.

As shown, a portion of linear actuators 500 may be extended to position end effector 302. In addition, disc actuator 502 may rotate end effector 302 in the direction of arrow 508.

Figure 8:
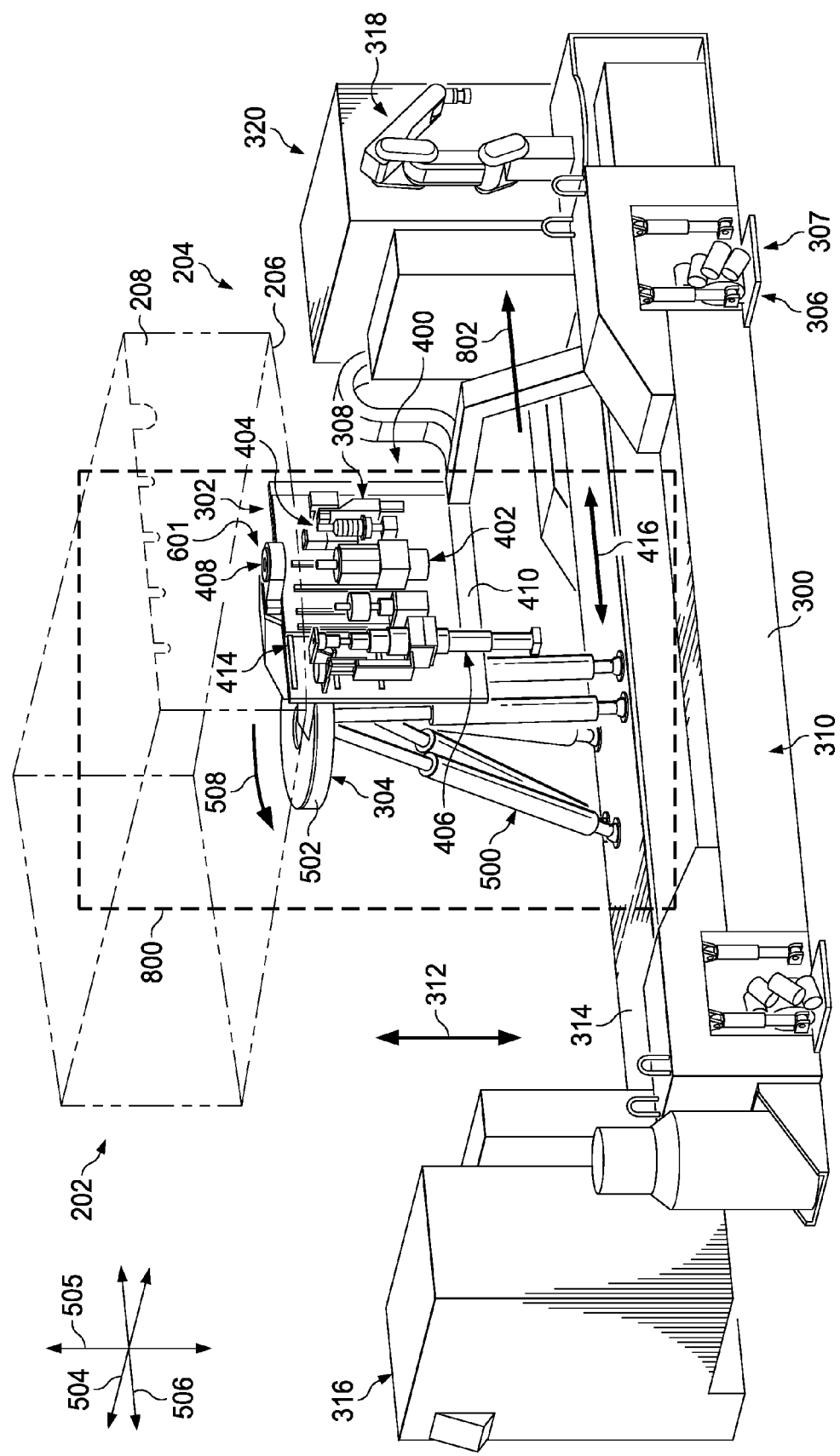

Turing next to FIG. 8, pressure foot 408 may contact surface 206 of panel 208. Pressure foot 408 may identify a contact force between pressure foot 408 and surface 206 of panel 208. Movement of end effector 302 may be slowed in response to the contact until end effector 302 is in a desired position against surface 206.

In this illustrative example, sensor system 400 may then be used to confirm a desired position for end effector 302 relative to surface 206. Sensor system 400 may confirm that end effector 302 and set of tools 308 are positioned perpendicular to surface 206 at location 601. Set of tools 308 is shown in section 800 in this illustrative example. Set of tools 308 may be moved in the direction of arrow 802 on track system 414 to move drilling system 402 into a position to drill the hole.

Figure 9:
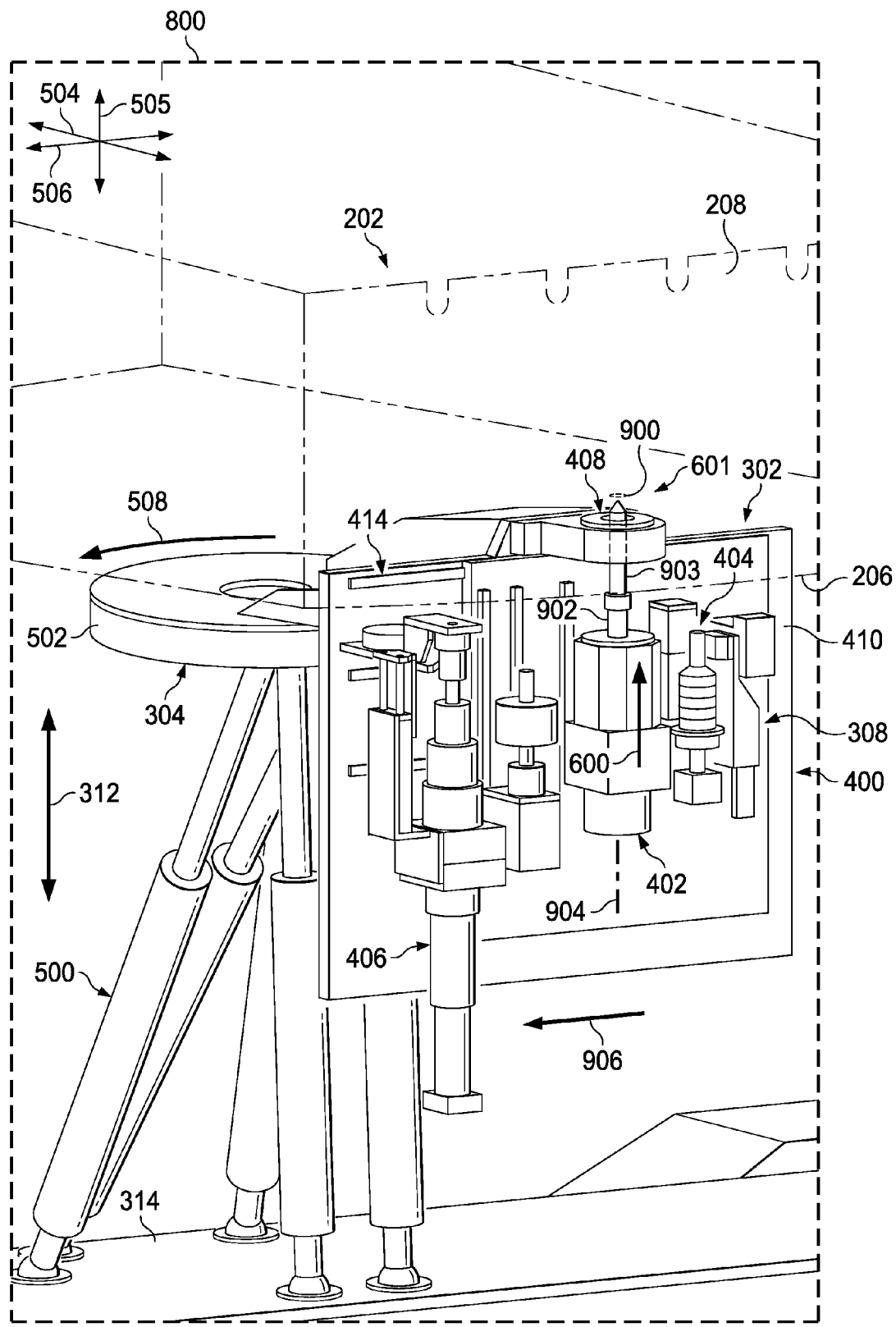

In FIG. 9, drilling system 402 may be used to drill hole 900 in surface 206 of panel 208 at location 601. In particular, spindle 902 with drill bit 903 may extend in the direction of arrow 600 along feed axis 904. Spindle 902 and feed axis 904 may be examples of spindle 154 and feed axis 156, respectively, in drilling system 140 shown in FIG. 1.

After drilling hole 900, spindle 902 may retract downward to its previous position. Set of tools 308 may then move in the direction of arrow 906 along track system 414 into a position to inspect hole 900.

Figure 10:
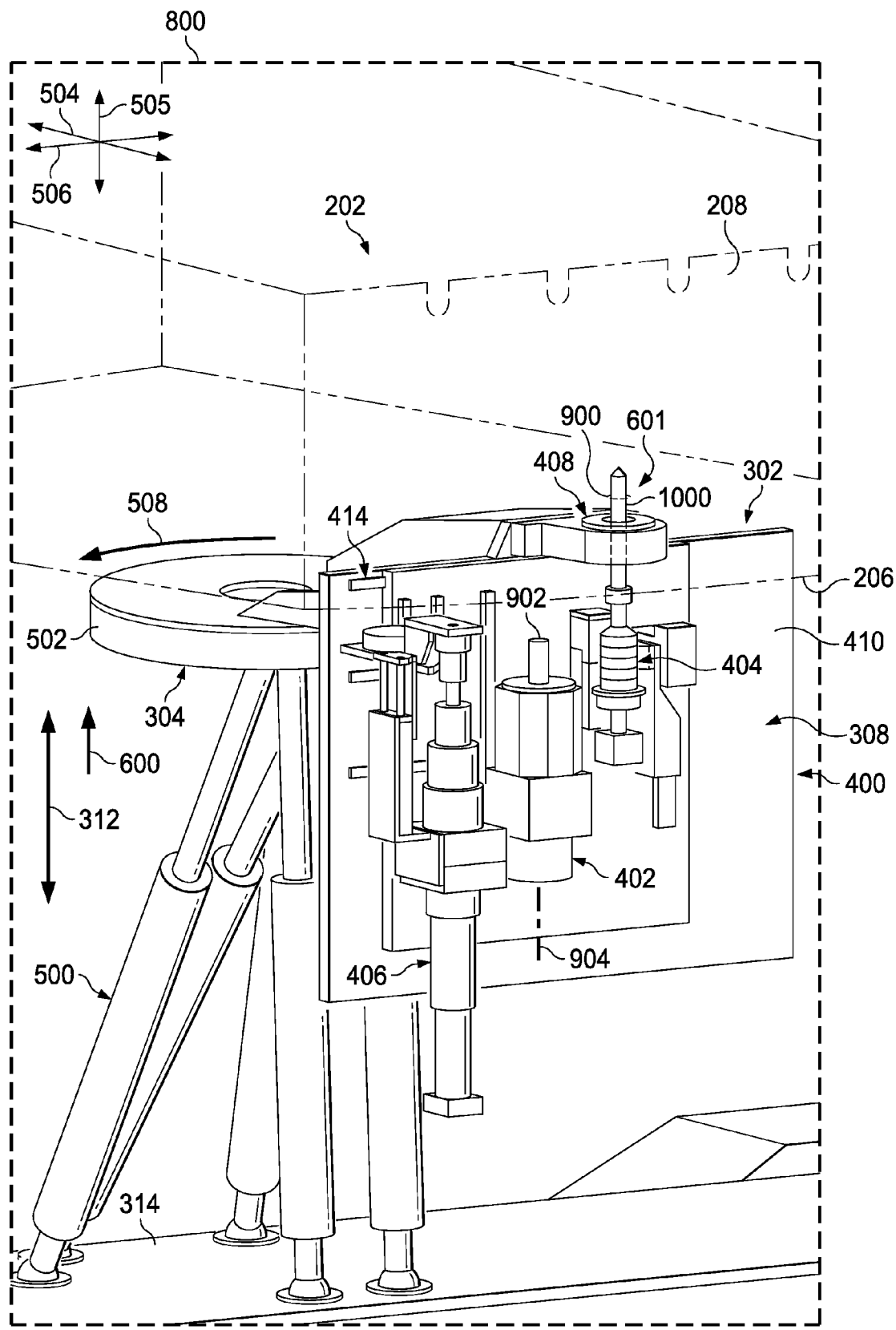

With reference to FIG. 10, inspection system 404 may be extended in the direction of arrow 600 to inspect hole 900. In this illustrative example, hole probe 1000 may be used to measure a diameter of hole 900. Hole probe 1000 may be an example of hole probe 160 shown in block form in FIG. 1.

After inspection of hole 900, hole probe 1000 retracts downward to its previous position. A fastener (not shown in this view) may then be installed in hole 900. End effector 302 and set of tools 308 may move to position fastener installer 406 relative to hole 900.

Figure 11:
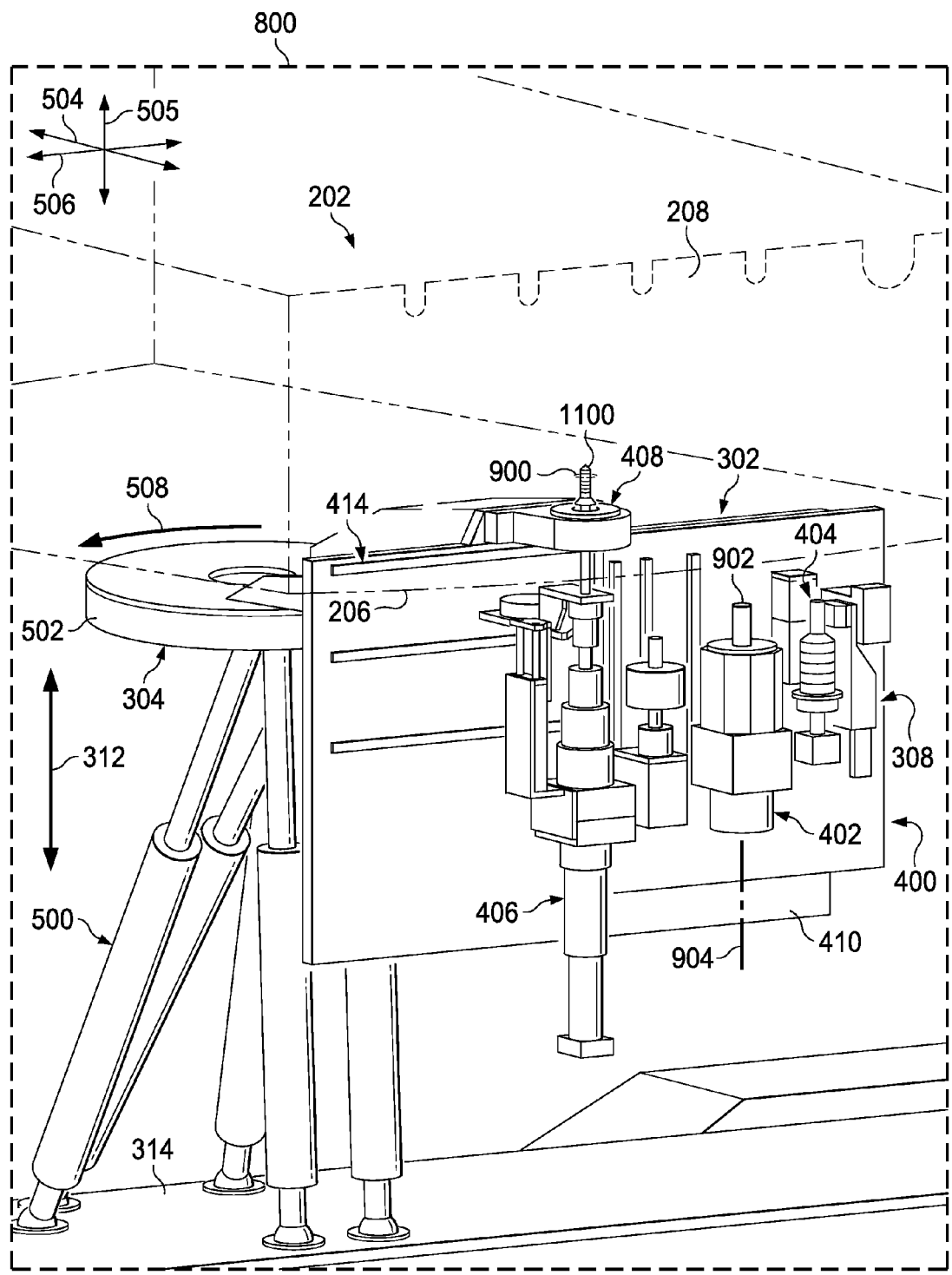

In FIG. 11, fastener installer 406 may insert fastener 1100 into hole 900. Fastener installer 406 may move from side to side using track system 414 and then extend vertically to insert fastener 1100 in hole 900.

Figure 12:
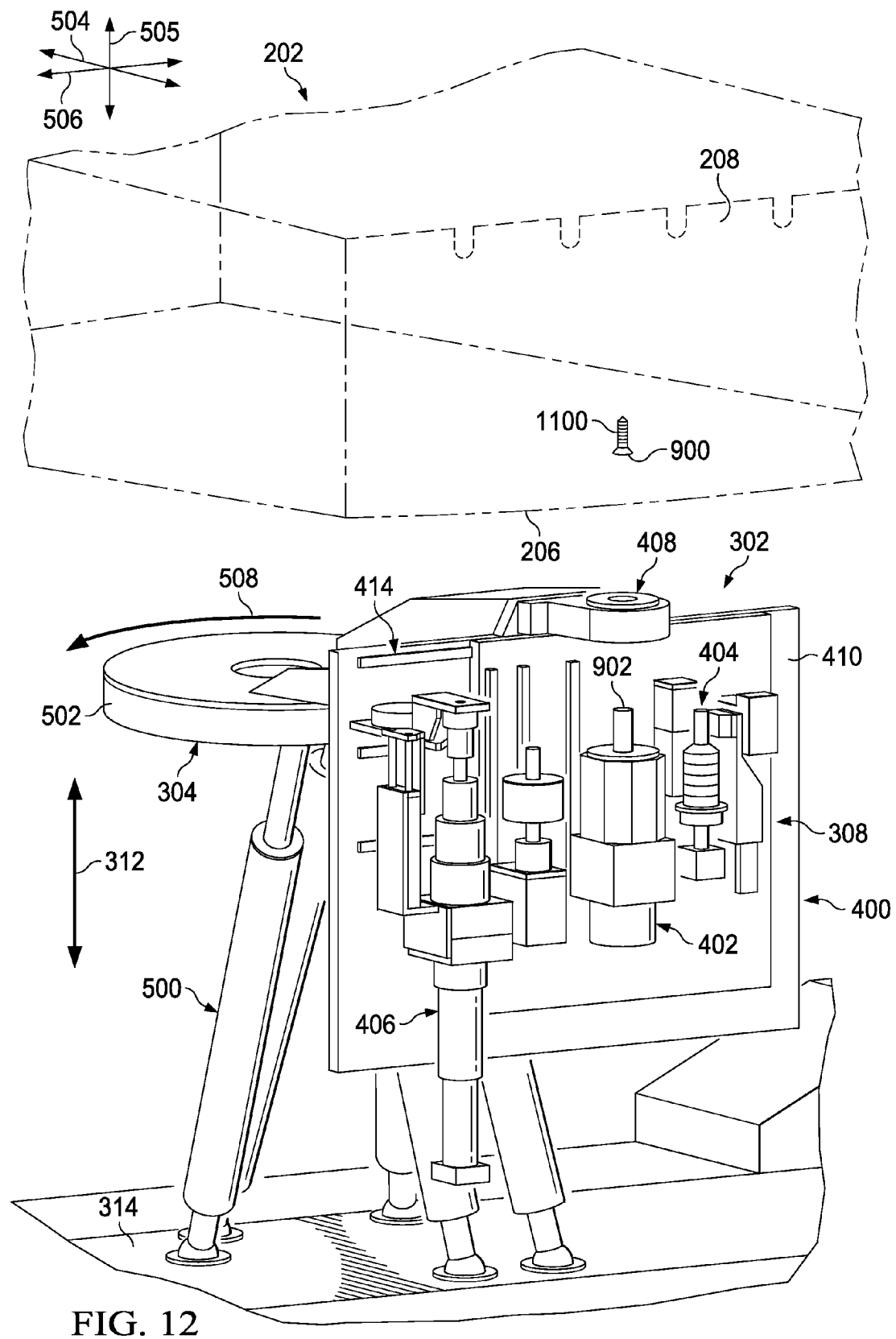

Referring now to FIG. 12, fastener installer 406 has installed fastener 1100 into hole 900. End effector 302 may now be repositioned relative to a next location to drill a hole.

In this illustrative example, assembly system 204 may be configured to provide "one-up assembly" of fasteners in panel 208. As used herein, "one-up" assembly may refer to the process of drilling and fastening joints without having to drill holes, to disassemble parts for cleaning and/or deburring before reassembling to install fasteners. This one-up assembly may increase the rate at which fasteners may be installed in panel 208 and also may increase wing assembly rates.

In other illustrative examples, assembly system 204 may not install fastener 1100. Instead, assembly system 204 may only drill and measure holes in panel 208. Various fasteners may be subsequently installed by assembly system 204, a human operator, some other type of device, or a combination thereof.

In another illustrative example, assembly system 204 may be used in a non-one-up assembly situation. For instance, assembly system 204 may first drill hole 900 and inspect the diameter of hole 900, before being moved away from panel 208. Panel 208 may then be lowered, cleaned, deburred, and reinstalled. Assembly system 204 then may be brought back into place for fastener insertion.

Figure 13:
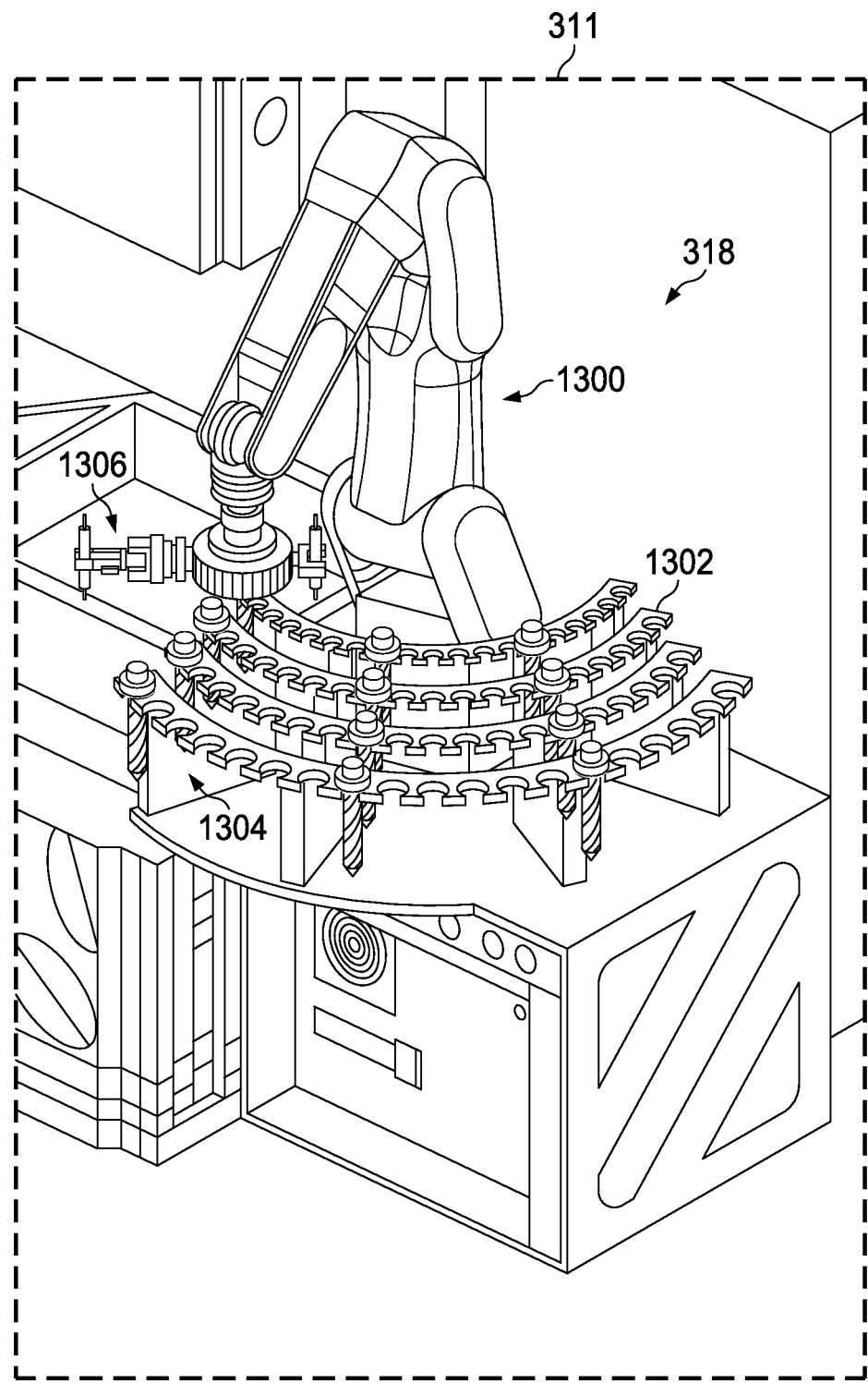
FIG. 13 is an illustration of a tool management system in accordance with an illustrative embodiment.

With reference next to FIG. 13, an illustration of tool management system 318 in section 311 from FIG. 3 is depicted in accordance with an illustrative embodiment. In this example, tool management system 318 is shown without other components in assembly system 204 to better show features of tool management system 318.

In this depicted example, tool management system 318 may include a number of components. As depicted, tool management system 318 may include robot arm 1300, storage rack 1302, and tools 1304.

As depicted, robot arm 1300 may have end effector 1306. End effector 1306 is configured to hold a portion of tools 1304 to exchange tools 1304 with end effector 302 shown in FIG. 3. For instance, end effector 1306 may exchange a probe, a drill bit, a removable pressure foot, or other tools with end effector 302, depending on the operations being performed by end effector 302.

In this illustrative example, storage rack 1302 also may hold a portion of tools 1304. Robot arm 1300 may use end effector 1306 to drop off a tool in storage rack 1302. In a similar fashion, robot arm 1300 may use end effector 1306 to pick up a tool stored in storage rack 1302. In this manner, tool management system 318 may provide various tools 1304 for use on panel 208 shown in FIG. 2.

Figure 14:
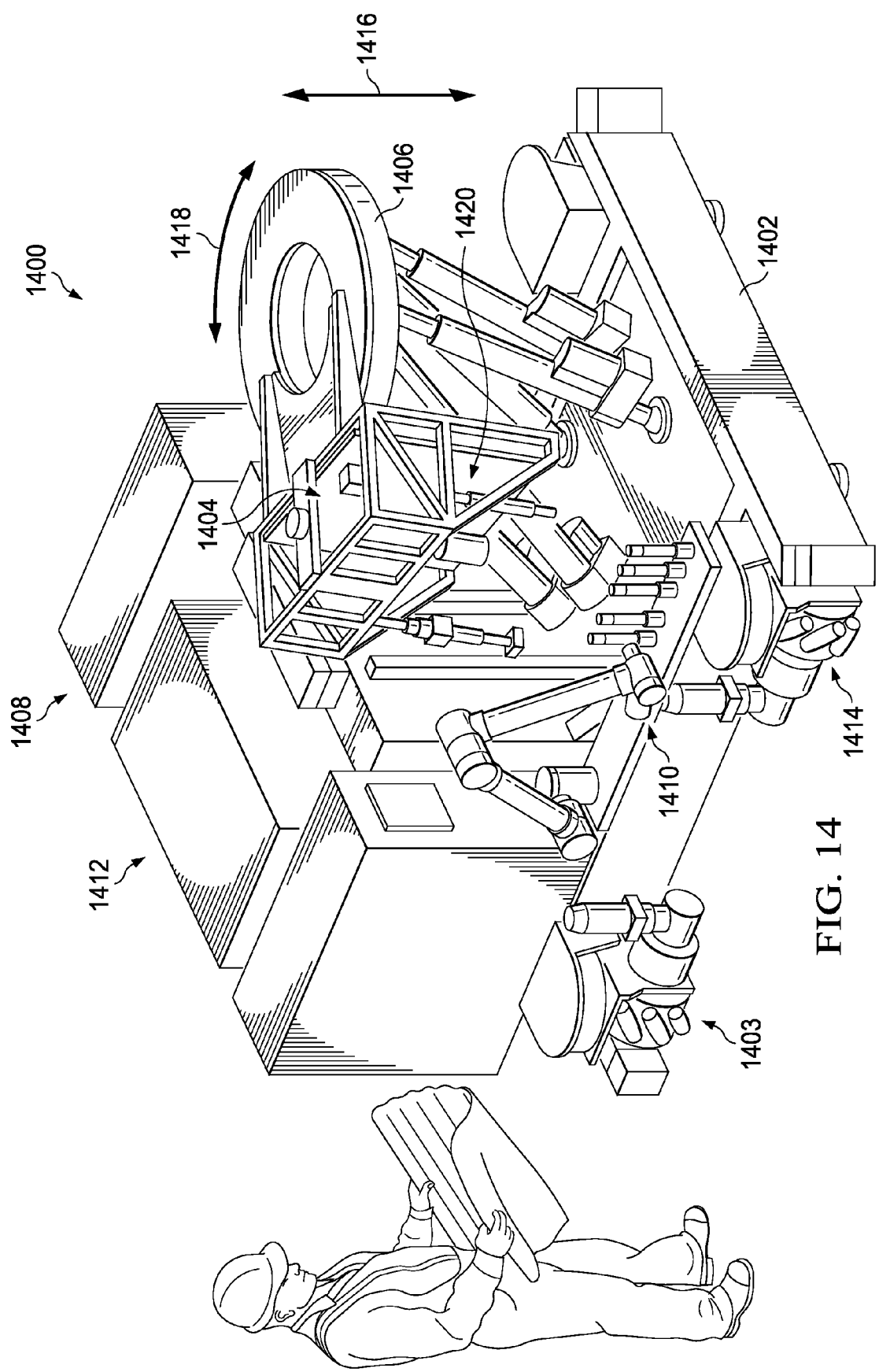
FIG. 14 is an illustration of another implementation for an assembly system in accordance with an illustrative embodiment.

In FIG. 14, an illustration of another implementation for an assembly system is depicted in accordance with an illustrative embodiment. In this depicted example, assembly system 1400 may be an example of a physical implementation for assembly system 102 shown in block form in FIG. 1.

As depicted, assembly system 1400 may include the same or different components from assembly system 204 shown in FIG. 2. In this illustrative example, assembly system 1400 may include mobile platform 1402, movement system 1403, end effector 1404, motion platform 1406, controller 1408, tool management system 1410, and fastener management system 1412. Mobile platform 1402, movement system 1403, end effector 1404, motion platform 1406, controller 1408, tool management system 1410, and fastener management system 1412 may be examples of physical implementations for mobile platform 118, first movement system 119, end effector 120, motion platform 122, controller 128, tool management system 126, and fastener management system 127, respectively, shown in block form in FIG. 1.

In this depicted example, movement system 1403 may include mecanum wheels 1414 attached to mobile platform 1402. Mecanum wheels 1414 are used to move mobile platform 1402. Mecanum wheels 1414 may be an example of a physical implementation for mecanum wheels 133 shown in block form in FIG. 1.

A second movement system (not shown in this view) may move motion platform 1406 along vertical axis 1416. Motion platform 1406 may move end effector 1404 relative to a surface of a structure (not shown in this view). This movement may include rotation in the direction of arrow 1418.

As illustrated, end effector 1404 may hold set of tools 1420 that perform operations on the structure. Set of tools 1420 may perform these operations under the control of controller 1408. Fastener management system 1412 and tool management system 1410 supply components to set of tools 1420 in this illustrative example.

The illustrations of assembly system 204 in FIGS. 2-13 and assembly system 1400 in FIG. 14 are not meant to imply physical or architectural limitations to the manner in which an illustrative embodiment may be implemented. Other components in addition to or in place of the ones illustrated may be used. Some components may be optional.

The different components shown in FIGS. 2-14 may be illustrative examples of how components shown in block form in FIG. 1 can be implemented as physical structures. Additionally, some of the components in FIGS. 2-14 may be combined with components in FIG. 1, used with components in FIG. 1, or a combination of the two.

Although the illustrative embodiments are shown and described with reference to panel 208 of a wing, assembly system 204 is not so limited. Assembly system 204 may be used for performing operations in lower sections of fuselage panels, lower wing to body joints, and other types of structures.

The illustrative embodiments may be used with various configurations of structures that hold wing assembly 202. For example, without limitation, assembly system 204 may be used with immobile or semi-mobile fixtures where there is access from below. Alternatively, assembly system 204 may be moved relative to drivable supports configured to hold wing assembly 202. These drivable supports may take the form of automated guided vehicles. In this manner, assembly system 204 is versatile in its use within manufacturing environment 200.

Figure 15:
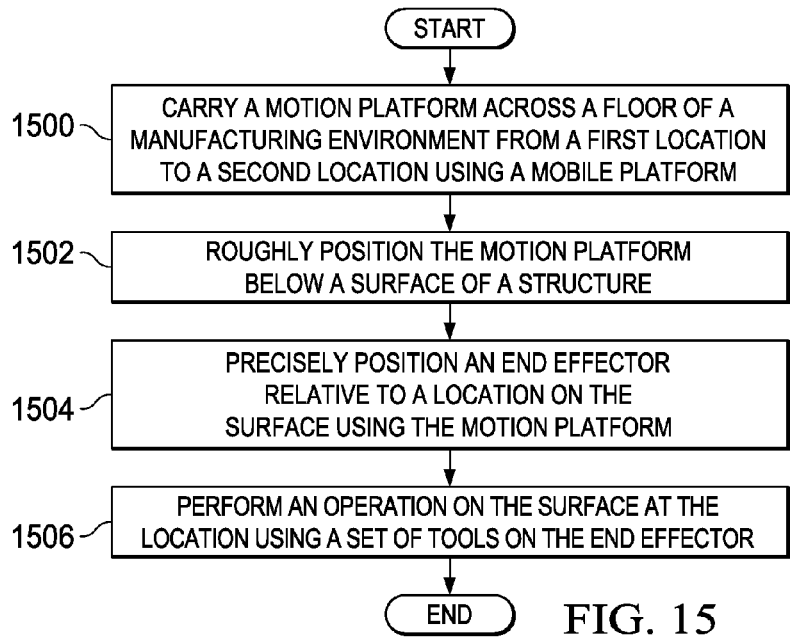
FIG. 15 is an illustration of a flowchart of a process for operating an assembly system to perform an operation on a structure in accordance with an illustrative embodiment.

With reference now to FIG. 15, an illustration of a flowchart of a process for operating assembly system 102 to perform operation 111 on structure 106 from FIG. 1 is depicted in accordance with an illustrative embodiment. In particular, the process illustrated in FIG. 15 may be implemented to install fastener 104 in panel 112. Control of the different operations may be performed by controller 128 in assembly system 102.

The process may begin by carrying motion platform 122 across floor 107 of manufacturing environment 100 from first location 117 to second location 121 using mobile platform 118 (operation 1500). Next, the process may roughly position motion platform 122 below surface 116 of structure 106 (operation 1502).

Thereafter, the process precisely positions end effector 120 relative to location 135 on surface 116 using motion platform 122 (operation 1504). End effector 120 may hold set of tools 132 to perform operation 111 on structure 106. The process then may perform operation 111 on surface 116 at location 135 using set of tools 132 on end effector 120 (operation 1506), with the process terminating thereafter.

Figure 16:
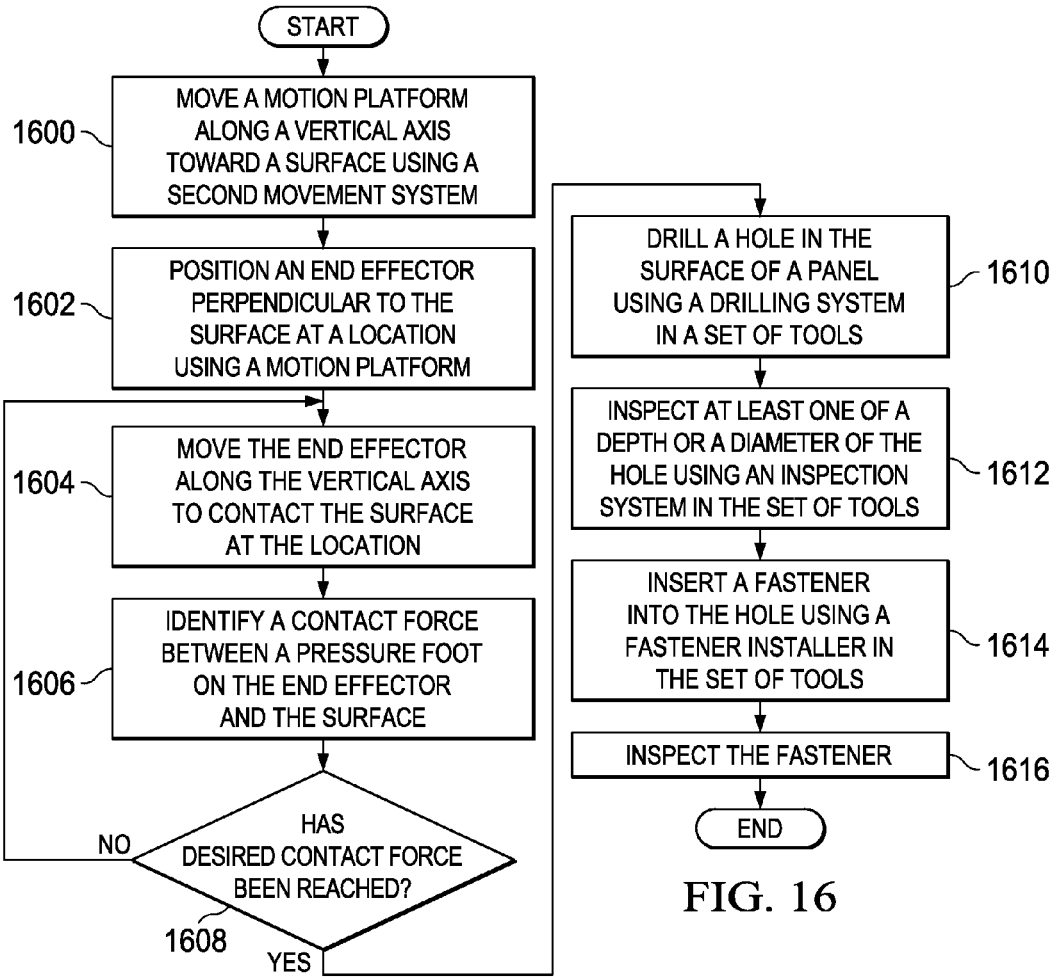
FIG. 16 is an illustration of a flowchart of a process for operating an assembly system to install a fastener in a panel of a structure in accordance with an illustrative embodiment.

Turning next to FIG. 16, an illustration of a flowchart of a process for operating assembly system 102 to install fastener 104 in panel 112 of structure 106 from FIG. 1 is depicted in accordance with an illustrative embodiment. The process illustrated in this figure also may be implemented after mobile platform 118 has reached second location 121. The process may begin by moving motion platform 122 along vertical axis 136 toward surface 116 using second movement system 124 (operation 1600).

The process may position end effector 120 perpendicular to surface 116 at location 135 using motion platform 122 (operation 1602). In some illustrative examples, end effector 120 is not positioned perpendicular to location 135, as described with reference to FIG. 1, above.

In operation 1602, sensor system 138 may identify position 148 of end effector 120 and compare that position to desired position 130 for end effector 120. End effector 120 may then be moved using a combination of components in motion platform 122.

Next, the process may move end effector 120 along vertical axis 136 to contact surface 116 at location 135 (operation 1604). The process identifies contact force 153 between pressure foot 151 on end effector 120 and surface 116 (operation 1606).

In this illustrative example, contact force 153 may be identified using a load cell or other load-sensing device. Contact force 153 may be identified to reduce undesired encounters between end effector 120 and surface 116, to determine whether desired contact force 153 has been reached, or both.

A determination may be made as to whether desired contact force 153 has been reached (operation 1608). The desired contact force 153 provides clamping force for panel 112 and its substructure. In some cases, no clamping force is necessary.

Controller 128 may compare contact force 153 identified by the load cell to a pre-determined contact force. If desired contact force 153 has been reached, the process drills hole 134 in surface 116 of panel 112 using drilling system 140 in set of tools 132 (operation 1610).

Thereafter, the process may inspect at least one of depth 155 or diameter 158 of hole 134 using inspection system 142 in set of tools 132 (operation 1612). For instance, hole probe 160 may be inserted into hole 134 to inspect hole 134. In other illustrative examples, inspection system 142 may inspect countersink depth, countersink angle, countersink normality to location 135, the normality of hole 134 to location 135, countersink diameter, grip length, or some other parameter for hole 134 as well.

The process then may insert fastener 104 into hole 134 using fastener installer 144 in set of tools 132 (operation 1614). In operation 1614, fastener management system 127 may assist fastener installer 144 by applying sealant 164 to fastener 104 and supplying fastener installer 144 with fastener 104 for insertion. The process may inspect fastener 104 (operation 1616) with the process terminating thereafter.

Returning to operation 1608, if desired contact force 153 has not been reached between surface 116 and end effector 120, the process returns to operation 1604 as described above. In this illustrative example, as set of tools 132 perform these operations, set of tools 132 may be moved along track system 147 in shuttle table 146 on end effector 120 to position each tool relative to hole 134. If additional adjustment is needed, at least one of second movement system 124 and motion platform 122 may be used. Further, tool management system 126 may exchange tools in set of tools 132 as needed.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1700 as shown in FIG. 17 and aircraft 1800 as shown in FIG. 18. Turning first to FIG. 17, an illustration of a block diagram of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 may go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of a block diagram of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. In particular, assembly system 102 from FIG. 1 may be used during various stages of aircraft manufacturing and service method 1700. For example, without limitation, location for holes in airframe 1802 may be determined during specification and design 1702. Further, assembly system 102 may be used to install fastener 104 in airframe 1802 of aircraft 1800 during component and subassembly manufacturing 1706. In another illustrative example, assembly system 102 may be used to perform drilling and inspection operations on airframe 1802 during routine maintenance and service 1714 or some other stage of aircraft manufacturing and service method 1700.

In one illustrative example, components or subassemblies produced in component and subassembly manufacturing 1706 in FIG. 17 may be fabricated or manufactured in a manner similar to components or subassemblies produced while aircraft 1800 is in service 1712 in FIG. 17. As yet another example, one or more apparatus embodiments, method embodiments, or a combination thereof may be utilized during production stages, such as component and subassembly manufacturing 1706 and system integration 1708 in FIG. 17. One or more apparatus embodiments, method embodiments, or a combination thereof may be utilized while aircraft 1800 is in service 1712, during maintenance and service 1714 in FIG. 17, or a combination thereof. The use of a number of the different illustrative embodiments may substantially expedite the assembly, reduce the cost of aircraft 1800, or both.

Thus, the illustrative embodiments may provide a method and apparatus for performing operation 111 on structure 106. In particular, operation 111 may include installing fastener 104. Structure 106 may take the form of panel 112 of wing 114 for aircraft 110 in this illustrative example. Assembly system 102 may comprise mobile platform 118, first movement system 119 associated with mobile platform 118, end effector 120, and motion platform 122. First movement system 119 may be configured to drive mobile platform 118 to desired position 130 relative to panel 112 for structure 106. End effector 120 may be configured to hold set of tools 132 and install fastener 104 in panel 112 using set of tools 132. Motion platform 122 may be configured to position set of tools 132 on end effector 120 relative to surface 116 of panel 112 to install fastener 104.

With the use of assembly system 102, operations may be performed on panel 112 without the need for manual drilling by human operators. The illustrative embodiments provide an autonomous, self-powered system that is capable of navigating under panel 112 without human intervention.

Even when used in conjunction with human operators, assembly system 102 may reduce the number of assembly operations performed by the human operators. For instance, assembly system 102 may use manually drilled holes in panel 112 as guides to install fasteners using fastener installer 144. In another illustrative example, assembly system 102 may drill and inspect the holes, using drilling system 140 and inspection system 142, and human operators may install the fasteners.

In both cases, performing operations on panel 112 may be done more efficiently and in less time than with some currently used systems. As a result, the time, cost, or both time and cost needed to manufacture aircraft 110 may be reduced.

The illustrative embodiments also provide an assembly system with alignment and positioning accuracy. Once under panel 112, end effector 120 may move with seven degrees of freedom to move set of tools 132 to desired position 130. Desired position 130 may be perpendicular to surface 116 in some illustrative examples. Sensor system 138 may continuously monitor the position of end effector 120. As a result, normality to surface 116 may be achieved, increasing the consistency and alignment of holes drilled in surface 116.

In addition, sensor system 138, inspection system 142, or both may be used to evaluate performance of assembly system 102. For example, without limitation, sensor system 138 may measure the flushness of fastener 104 installed in panel 112. Subsequent installations may be modified based on this information to more accurately install fasteners. As another example, inspection system 142 may be used to ensure consistency between holes drilled in panel 112. As a result, less rework may be needed, which further reduces manufacturing time for wing 114.

The illustrative embodiments also provide the ability to account for various heights of panel 112 above the floor. For example, in some cases, the desired wing height during assembly may be too close to the ground for human operators to access. Assembly system 102 may be configured to fit between the floor and panel 112 to perform operations.

The illustrative embodiments also allow operations to be performed on panel 112 without the need for fixed monument fixtures or fixed tool systems in manufacturing environment 100. Instead, assembly system 102 moves about manufacturing environment using retractable wheels 131. In this manner, manufacturing environment 100 may be reconfigured as needed. Moreover, fewer steps may be needed to set up manufacturing environment 100. For example, concrete work to secure fixed monument fixtures may be reduced or eliminated. Monument builds or fixed tool system installation also may be reduced or eliminated. Accordingly, cost savings may be realized.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An assembly system for a structure comprising:
a motion platform, configured to be positioned below a surface of the structure to perform an operation on the surface, and connected to a shuttle table, configured to hold and move a set of tools and configured to move through seven degrees of motion via connection to a disk actuator connected to linear actuators configured to move the disk actuator through six degrees of motion; and a mobile platform configured to carry the motion platform across a floor of a manufacturing environment from a first location to a second location.

2. The assembly system of claim 1 further comprising:
An end effector on the motion platform, wherein the end effector is configured to hold the set of tools and perform the operation using the set of tools.

3. The assembly system of claim 2, wherein the motion platform is configured to position the set of tools on the end effector in a desired position relative to the surface of the structure to perform the operation on the structure.

4. The assembly system of claim 2, wherein the motion platform is configured to position the set of tools perpendicular to a location on the surface of the structure.

5. The assembly system of claim 2, wherein the motion platform is configured to position the set of tools parallel to a location on the surface of the structure.

6. The assembly system of claim 2, wherein the motion platform is configured to position the set of tools co-linear to a central axis of a location for a fastener.

7. The assembly system of claim 2, wherein the set of tools comprises:
a sensor system configured to identify at least one of the surface of the structure, a position of the end effector relative to the surface of the structure, or a location on the surface of the structure to drill a hole for a fastener.

8. The assembly system of claim 7, wherein the sensor system is configured to identify the position of the end effector based on index features on the surface of the structure.

9. The assembly system of claim 2 further comprising:
a pressure foot connected to the end effector and configured to identify a contact force between the pressure foot and the surface of the structure.

10. The assembly system of claim 2, wherein the set of tools comprises:
a drilling system configured to drill a hole in the surface of the structure.

11. The assembly system of claim 10, wherein the set of tools comprises:
an inspection system configured to inspect the hole drilled in the surface of the structure.

12. The assembly system of claim 11, wherein the inspection system is configured to inspect a sealant applied to a fastener.

13. The assembly system of claim 11, wherein the inspection system is configured to inspect a fastener installed in the hole.

14. The assembly system of claim 10, wherein the set of tools comprises:
a fastener installer configured to insert a fastener into the hole drilled in the surface of the structure.

15. The assembly system of claim 14 further comprising:
a fastener management system configured to hold fasteners, apply a sealant to the fastener in the fasteners, and supply the fastener to the fastener installer.

16. The assembly system of claim 1 further comprising:
a movement system associated with the mobile platform and configured to drive the mobile platform from the first location to the second location.

17. The assembly system of claim 16, wherein the movement system is a first movement system and further comprising:
a second movement system associated with the motion platform and configured to move the motion platform along a vertical axis toward the surface of the structure.

18. The assembly system of claim 1, wherein steering direction for the mobile platform to steer from the first location to the second location is provided by at least one of human operators, a controller associated with the mobile platform, or a system controller.

19. The assembly system of claim 1, wherein the mobile platform is configured to steer itself.

20. A method for operating an assembly system, the method comprising:
connecting a set of tools to a motion platform;
connecting a motion platform to a shuttle table via connecting a disk actuator to linear actuators configured for moving the disk actuator through six degrees of motion;
carrying the motion platform across a floor of a manufacturing environment from a first location to a second location using a mobile platform; and
positioning the motion platform below a surface of a structure and performing an operation on the surface via holding and moving the set of tools through seven degrees of motion.

21. The method of claim 20 further comprising:
positioning an end effector relative to the surface of the structure using the motion platform, wherein the end effector is configured to hold a set of tools and perform the operation on the structure using the set of tools.

22. The method of claim 21 further comprising:
performing the operation on the structure using the set of tools.

23. The method of claim 21 further comprising:
installing a fastener in the structure using the set of tools.

24. The method of claim 21 further comprising:
positioning the end effector perpendicular to a location on the surface of the structure using the motion platform.

25. The method of claim 21 further comprising:
positioning the set of tools relative to a location on the surface of the structure using the motion platform.

26. The method of claim 21 further comprising:
positioning the set of tools parallel to a location on the surface of the structure using the motion platform.

27. The method of claim 21 further comprising:
positioning the set of tools co-linear to a central axis of a location for a fastener using the motion platform.

28. The method of claim 21 further comprising:
positioning the set of tools perpendicular to a location on the surface of the structure using the motion platform.

29. The method of claim 21 further comprising:
drilling a hole in the surface of the structure using a drilling system in the set of tools.

30. The method of claim 29 further comprising:
inspecting at least one of a depth or a diameter of the hole using an inspection system in the set of tools.

31. The method of claim 30 further comprising:
inserting a fastener into the hole using a fastener installer in the set of tools.

32. The method of claim 31 further comprising:
applying a sealant to the fastener using a fastener management system; and
receiving the fastener from the fastener management system using the fastener installer, wherein the fastener is received prior to inserting the fastener with the sealant into the hole.

33. The method of claim 32 further comprising:
inspecting the fastener installed in the hole using the inspection system.

34. The method of claim 21 further comprising:
identifying a contact force between a pressure foot connected to the end effector and the surface of the structure.

35. The method of claim 20 further comprising:
driving the mobile platform across the floor of the manufacturing environment from the first location to the second location using a movement system.

36. The method of claim 20, wherein the operation is selected from one of a drilling operation, a fastening operation, an inspection operation, a measurement operation, a cleaning operation, a sealing operation, and a data collection operation.

37. The method of claim 20 further comprising:
steering the mobile platform from the first location to the second location.

38. A method for installing a fastener in a lower skin panel of a structure, the method comprising:
connecting linear actuators, configured for moving through six degrees of motion, to a hexapod;
driving a mobile platform carrying the hexapod across a floor of a manufacturing environment from a first location to a second location using a movement system;
positioning an end effector on the hexapod under the lower skin panel via holding and moving a set of tools through seven degrees of motion via connecting a disk actuator to the linear actuators; and
installing the fastener in the lower skin panel.

39. The method of claim 38, further comprising the hexapod being a motion platform.

40. The method of claim 39 further comprising:
drilling a hole in the surface of the lower skin panel using a drilling system in the set of tools.

41. The method of claim 40 further comprising:
inspecting the hole drilled in the surface of the lower skin panel using an inspection system in the set of tools.

\* \* \* \* \*

UNITED STATES PATENT AND TRADEMARK OFFICE
CERTIFICATE OF CORRECTION

PATENT NO. : 9,486,917 B2  
APPLICATION NO. : 14/558859  
DATED : November 8, 2016  
INVENTOR(S) : Reid et al.

Page 1 of 1

It is certified that error appears in the above-identified patent and that said Letters Patent is hereby corrected as shown below:

In the Specification

Column 1, Line 19, change "Ser. No. 14/558,034" to -- Ser. No. 14/559,034 --

In the Claims

Column 22, Line 56, Claim 1 change "of motion" to -- of freedom --
    Line 59, change "motion;" to -- freedom; --

Column 24, Line 7, Claim 20 change "motion;" to -- freedom; --
    Line 14, change "of motion" to -- of freedom --

Column 25, Line 12, Claim 38 change "of motion" to -- of freedom --
    Line 18, change "of motion" to -- of freedom --

Signed and Sealed this
Twenty-sixth Day of December, 2017

Joseph Matal
*Performing the Functions and Duties of the
Under Secretary of Commerce for Intellectual Property and
Director of the United States Patent and Trademark Office*